US012809814B2

(12) United States Patent
Sheng et al.

(10) Patent No.: US 12,809,814 B2
(45) Date of Patent: Nov. 24, 2026

(54) SOLVER BASED BUFFER DEPTH BALANCING FOR DATAFLOW AI ACCELERATOR ARCHITECTURE

(71) Applicant: SambaNova Systems, Inc., Palo Alto, CA (US)

(72) Inventors: Feng Sheng, Palo Alto, CA (US); Gao Deng, Palo Alto, CA (US); Zhichao Ma, Palo Alto, CA (US); Yu Zhao, Palo Alto, CA (US); Qinghua Li, Palo Alto, CA (US); Xiaoming Gu, Palo Alto, CA (US)

(73) Assignee: SambaNova Systems, Inc., San Jose, CA (US)

( * ) Notice: Subject to any disclaimer, the term of this patent is extended or adjusted under 35 U.S.C. 154(b) by 88 days.

(21) Appl. No.: 19/055,167

(22) Filed: Feb. 17, 2025

(65) Prior Publication Data

US 2025/0265223 A1 Aug. 21, 2025

Related U.S. Application Data

(60) Provisional application No. 63/555,231, filed on Feb. 19, 2024.

(51) Int. Cl.
*G06F 15/78* (2006.01)

(52) U.S. Cl.
CPC ...... *G06F 15/7871* (2013.01); *G06F 15/7839* (2013.01)

(58) Field of Classification Search
CPC ......................... G06F 15/7871; G06F 15/7839
See application file for complete search history.

(56) References Cited

U.S. PATENT DOCUMENTS 7,817,655 B1 * 10/2010 Bennett ................. G06F 30/327 370/412
2003/0101441 A1 * 5/2003 Harrison, III ......... G06F 8/4441 717/146

(Continued)

OTHER PUBLICATIONS

Koeplinger et al., Spatial: A Language and Compiler for Application Accelerators, PLDI '18, Jun. 18-22, 2018, Association for Computng Machinery, 16 pages.

(Continued)

*Primary Examiner* — Farley Abad
(74) *Attorney, Agent, or Firm* — FP; Sikander M. Khan

(57) ABSTRACT

A method for reducing latency and increasing throughput in a reconfigurable computing system includes receiving a user program for execution on a reconfigurable dataflow computing system, comprising a grid of interconnected compute units and grid of memory units. The user program includes multiple tensor-based algebraic expressions that are converted to an intermediate representation comprising multiple stages. Each stage includes one or more logical operations executable via dataflow through compute units, and each stage is preceded by and followed by a stage buffer, each stage buffer corresponding to one or more memory units. The method includes detecting a final joining stage that consumes a first and second dataflow path, having a first and second total stage buffer depth, respectively, and balancing the first and second total stage buffer depths via tuning or inserting a whole stage buffer, wherein a total associated PMU cost is minimized.

19 Claims, 18 Drawing Sheets

(56) References Cited

U.S. PATENT DOCUMENTS

| | | | | |
|---|---|---|---|---|
| 2020/0160159 | A1* | 5/2020 | Azari | G06F 13/4027 |
| 2024/0311025 | A1* | 9/2024 | Rao | G06F 3/0659 |

OTHER PUBLICATIONS

Prabhakar et al., Plasticine: A Reconfigurable Architecture for Parallel Patterns, ISCA, Jun. 24-28, 2017, 14 pages.
Zhang et al "SARA: Scaling a Reconfigurable Dataflow Accelerator" 2021 ACM/IEEE48th Annual International Symposium on Computer Architecture 2021 pp. 1041-1054.

* cited by examiner 700, 710

User Program Statements

```
Linear = torch.nn.linear(K,N)
Relu = torch.nn.relu
Softmax = torch.nn.Softmax(dim=3)
X1 = torch.randn(N, C, M, K)
X2 = %1.to("RDP")
X3 = Linear(X2)
X4 = Relu(X3)
X5 = Softmax(X4)
X6 = X5.to("CPU")
```

750

User Program Computation Graph

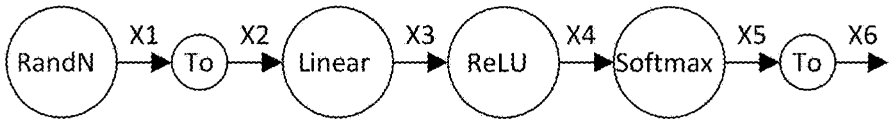

FIG. 7

720

| Air/Tensor Statements | Tensor Size | |
|---|---|---|
| %1 = air.Input(name: "In0"): | NxCxMxK bf16 | |
| %2 = air.Linear(%1): | NxCxMxN bf16 | |
| %3 = air.ReLU(%2): | NxCxMxN bf16 | |
| %4 = air.Exp(%3): | NxCxMxN bf16 | Softmax lowering |
| %5 = air.Sum(%4, dim: 3): | NxCxMx1 bf16 | Softmax lowering |
| %6 = air.Div(%4, %5): | NxCxMxN bf16 | Softmax lowering |
| %7 = air.Output(%6) | | |

725

Air/Tensor Computation Graph

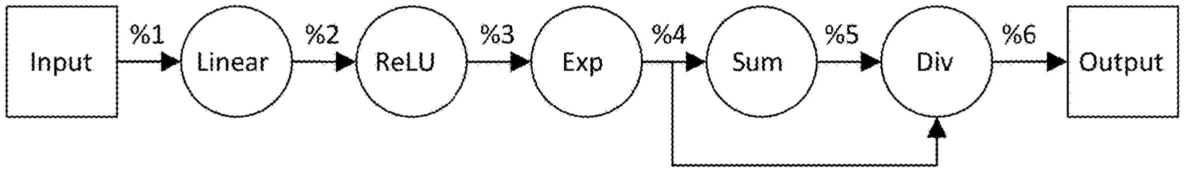

FIG. 7B

730

| Template Dataflow Statements | Tensor Size |
|---|---|
| %1 = tlir.Region(name: "In0"): | NxCxMxK bf16 |
| %2 = tlir.Region(name: "Weight"): | KxN bf16 |
| %3 = tlir.Region(name: "Bias"): | 1xN bf16 |
| %4 = tlir.Region(name: "Out0"): | NxCxMxN bf16 |
| %5 = tlir.Load(%2) | |
| %6 = tlir.Load(%3) | |
| %7 = tlir.MetaPipeline(iters: N) { (732) | |
| %8 = tlir.Load(%1, dim: 1): | CxMxK bf16 |
| %9 = tlir.Buffer(%5, depth: 2): | CxMxK bf16 |
| %10 = tlir.MetaPipeline(iters: C) { (732) | |
| %11 = tlir.ReadSlice(%9, dim: 1): | MxK bf16 |
| %12 = tlir.Linear(%5, %11): | MxN bf16 |
| %13 = tlir.Buffer(%12, depth: 2): | MxN bf16 |
| %14 = tlir.AddBias(%13, %6): | MxN bf16 |
| %15 = air.ReLU(%14): | MxN bf16 |
| %16 = air.Exp(%15): | MxN bf16 |
| %17 = tlir.Buffer(%16, depth: 2): | MxN bf16 |
| %18 = tlir.Sum(%17, dim: 1): | Mx1 bf16 |
| %19 = tlir.Div(%17, %18): | MxN bf16 |
| %20 = tlir.Store(%4, %19) | |
| } | |
| } | |

735 Unstitched Template Computation Graph

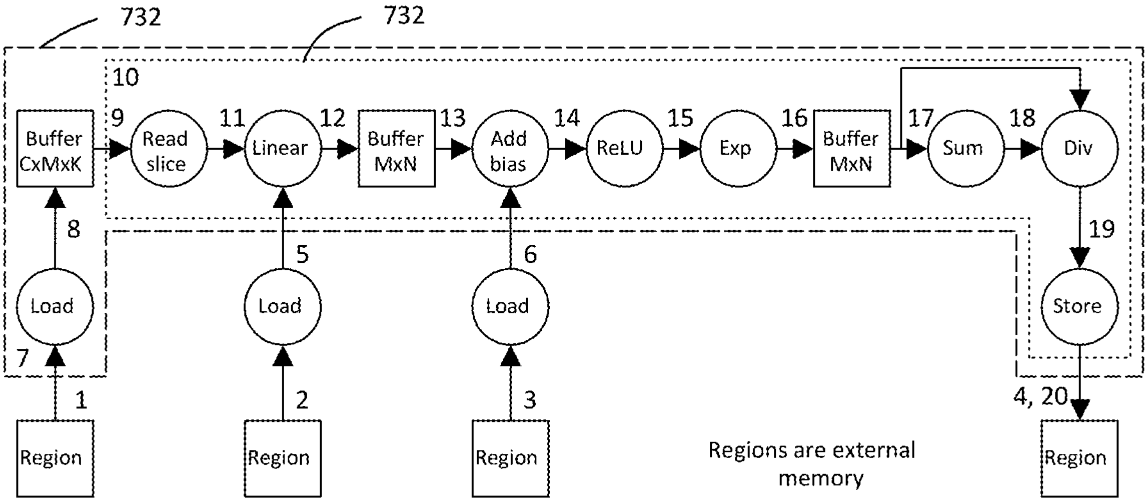

FIG. 7C

750
Logical Compute Graph
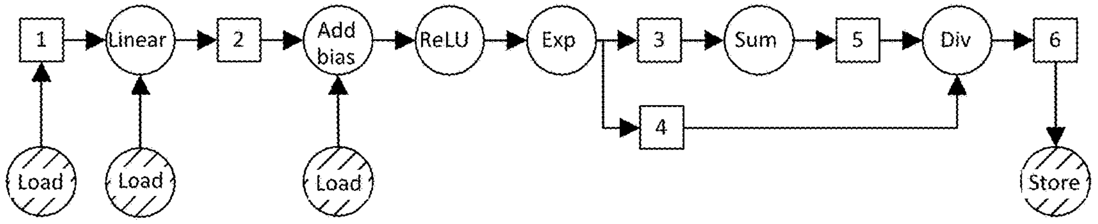
755
Physical Layout Diagram
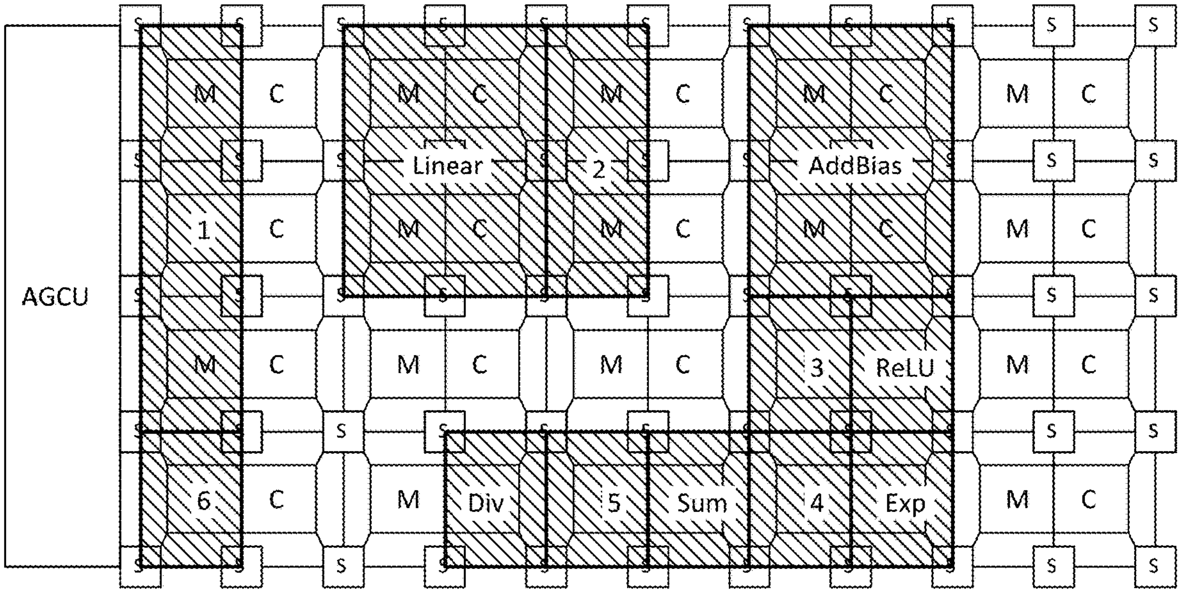
FIG. 7E

1300

1310

Mixed Integer Programming

| | |
|---|---|
| Find a vector | **x** |
| that maximizes | $c^T\mathbf{x}$ |
| subject to | $A\mathbf{x} \le b$ |
| and | $\mathbf{x} \ge 0$ |

(some of x are integers)

1320

Variables

*depth_i* : depth of stage buffer i
*new_buffer_depth_j* : depth of necessary new (whole or partial) stage buffer j
*pmu_i* : number PMU resources to implement stage buffer i
*load_L* : load data starting time

1330

Load Time Exhibition

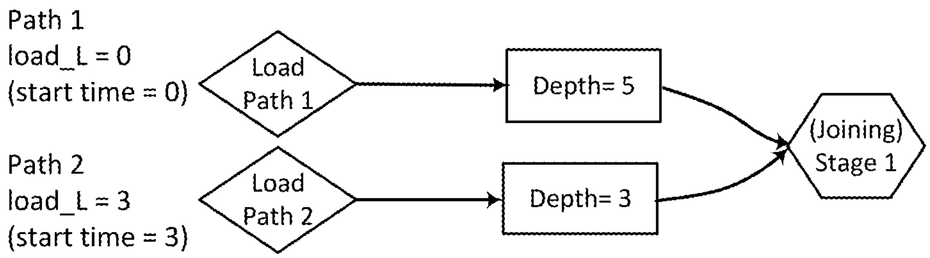

1340

Constraints

Buffer resource constraint:
***pmu_i * depth_per_PMU ≥ depth_i***
***pmu_j * depth_per_PMU ≥ new_buffer_depth_j***

Dataflow path stage buffer depth constraint:
*load_L* *in path1 + sum(depth_i in path1) + sum(new_buffer_depth_j in path1) =*
*load_L* *in path2 + sum(depth_i in path2) + sum(new_buffer_depth_j in path2)*

1350

Objective Function

Minimize sum(*pmu_i*, *pmu_j*) of all paths

FIG. 13

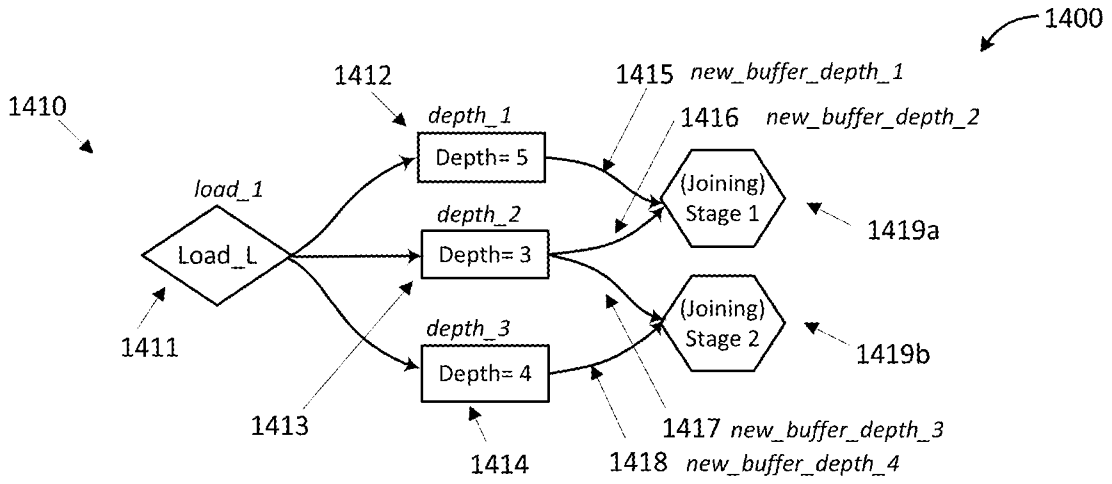
1420
For joining stage 1:
*load_1* + *depth_1* + *new_buffer_depth_1* = *load_1* + *depth_2* + *new_buffer_depth_2*
For joining stage 2:
*load_1* + *depth_2* + *new_buffer_depth_3* = *load_1* + *depth_3* + *new_buffer_depth_4*
To minimize:
sum_of_PMU_usage(*buffer_1~3, new_buffer_1~4*)
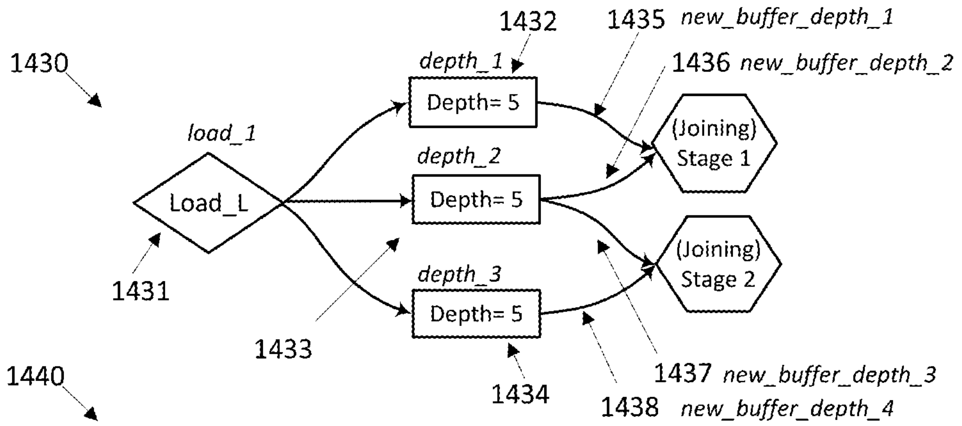
<u>Solution # 1 via global solver:</u>
*load_1* = 0
*depth_1* = 5
*depth_2* = 5
*depth_3* = 5
*new_buffer_depth_1* = none
*new_buffer_depth_2* = none
*new_buffer_depth_3* = none
*new_buffer_depth_4* = none
FIG. 14A

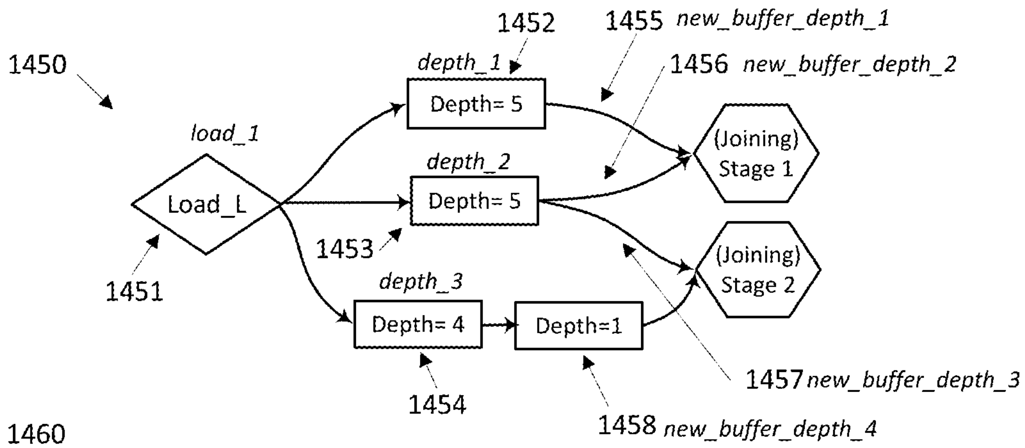

1460

Solution # 2 via global solver:

*load_1* = 0
*depth_1* = 5
*depth_2* = 5
*depth_3* = 4
*new_buffer_depth_1* = none
*new_buffer_depth_2* = none
*new_buffer_depth_3* = none
*new_buffer_depth_4* = 1

1470

Choose between Solution #1 and Solution # 2 by evaluating total associated PMU cost:

Solution #1: tuning *buffer_3*:
If increase *depth_2* = 3 to *depth_2* = 5, then cost of PMU use = 3 PMU
If increase *depth_3* = 4 to *depth_3* = 5, then cost of PMU use = 2 PMU Solution #2: inserting *new_buffer_4*:
If increase *depth_2* = 3 to *depth_2* = 5, then cost of PMU use = 3 PMU
If insert *new_buffer_depth_4* = 1, then cost of PMU use = 1 PMU

Result:
Optimal solution is Solution #2, which minimizes total associated PMU costs

FIG. 14B

SOLVER BASED BUFFER DEPTH BALANCING FOR DATAFLOW AI ACCELERATOR ARCHITECTURE

RELATED APPLICATIONS AND DOCUMENTS

This application claims the benefit of (priority to) U.S. Provisional Application 63/555,231 filed on Feb. 19, 2024, entitled "Solver based buffer depth balancing for dataflow AI accelerator architecture".

This application is related to the following papers and commonly owned applications:

- Prabhakar et al., "Plasticine: A Reconfigurable Architecture for Parallel Patterns," ISCA '17, Jun. 24-28, 2017, Toronto, ON, Canada;
- Koeplinger et al., "Spatial: A Language And Compiler For Application Accelerators," Proceedings Of The 39th ACM SIGPLAN Conference On Programming Language Design And Embodiment (PLDI), Proceedings of the 43rd International Symposium on Computer Architecture, 2018;
- Zhang et al., "SARA: Scaling a Reconfigurable Dataflow Accelerator," 2021 ACM/IEEE 48th Annual International Symposium on Computer Architecture (ISCA), 2021, pp. 1041-1054;
- U.S. Nonprovisional patent application Ser. No. 16/260,548, filed Jan. 29, 2019, entitled "MATRIX NORMAL/TRANSPOSE READ AND A RECONFIGURABLE DATA PROCESSOR INCLUDING SAME";
- U.S. Nonprovisional patent application Ser. No. 15/930,381, filed May 12, 2020, entitled "COMPUTATIONALLY EFFICIENT GENERAL MATRIX-MATRIX MULTIPLICATION (GEMM)";
- U.S. Nonprovisional patent application Ser. No. 16/890,841, filed Jun. 2, 2020, entitled "ANTI-CONGESTION FLOW CONTROL FOR RECONFIGURABLE PROCESSORS";
- U.S. Nonprovisional patent application Ser. No. 17/023,015, filed Sep. 16, 2020, entitled "COMPILE TIME LOGIC FOR DETECTING STREAMING COMPATIBLE AND BROADCAST COMPATIBLE DATA ACCESS PATTERNS";
- U.S. Nonprovisional patent application Ser. No. 17/031,679, filed Sep. 24, 2020, entitled "SYSTEMS AND METHODS FOR MEMORY LAYOUT DETERMINATION AND CONFLICT RESOLUTION";
- U.S. Nonprovisional patent application Ser. No. 17/216,647, filed Mar. 29, 2021, entitled "TENSOR PARTITIONING AND PARTITION ACCESS ORDER";
- U.S. Provisional Patent Application No. 63/190,749, filed May 19, 2021, entitled "FLOATING POINT MULTIPLY-ADD, ACCUMULATE UNIT WITH CARRY-SAVE ACCUMULATOR";
- U.S. Provisional Patent Application No. 63/174,460, filed Apr. 13, 2021, entitled "EXCEPTION PROCESSING IN CARRY-SAVE ACCUMULATION UNIT FOR MACHINE LEARNING";
- U.S. Nonprovisional patent application Ser. No. 17/397,241, filed Aug. 9, 2021, entitled "FLOATING POINT MULTIPLY-ADD, ACCUMULATE UNIT WITH CARRY-SAVE ACCUMULATOR";
- U.S. Nonprovisional patent application Ser. No. 17/520,290, filed Nov. 5, 2021, entitled "SPARSE MATRIX MULTIPLIER IN HARDWARE AND A RECONFIGURABLE DATA PROCESSOR INCLUDING SAME";

All of the related application(s) and documents listed above are hereby incorporated by reference herein for all purposes.

BACKGROUND

The present subject matter relates to optimizing computing tasks for course-grained reconfigurable (CGR) processors.

Reconfigurable processors can be configured to implement a variety of functions more efficiently or faster than might be achieved using a general-purpose processor executing a computer program. For example, coarse-grain reconfigurable architectures (e.g. CGRAs) are being developed in which the configurable units in the array are more complex than used in typical, more fine-grained FPGAs, and may enable faster or more efficient (e.g., dataflow) execution of various classes of functions. For example, CGRAs have been proposed that can enable implementation of energy-efficient accelerators for machine learning and artificial intelligence workloads. See, Prabhakar, et al., "Plasticine: A Reconfigurable Architecture for Parallel Patterns," ISCA '17, Jun. 24-28, 2017, Toronto, ON, Canada.

Despite the promise of CGRAs, optimizing the compute graphs for the configurable units of a CRGA remains a challenge.

SUMMARY OF THE INVENTION

A method for improving runtime performance and alleviating place and route issues in a reconfigurable computing system that includes receiving a compute graph for execution on a reconfigurable dataflow processor and that includes a grid of compute units and a grid of memory units connected with a switching array.

BRIEF DESCRIPTION OF THE DRAWINGS

FIGS. 7A-7E illustrate various representations of an example user program corresponding to various stages of a compiler stack such as the compiler stack of FIG. 6.

FIG. 13 shows a set of variables, constraints, and an objective function used by the global solver-based buffer balancing, as described herein.

FIG. 14A illustrates an example of a before-compute subgraph, as well as constraints and an objective function to generate a first solution for an after-compute subgraph.

FIG. 14B illustrates an example of a second solution for an after-compute subgraph and an example of minimizing a total associated PMU cost to select between the first and second solutions.

DETAILED DESCRIPTION

Figure 1:
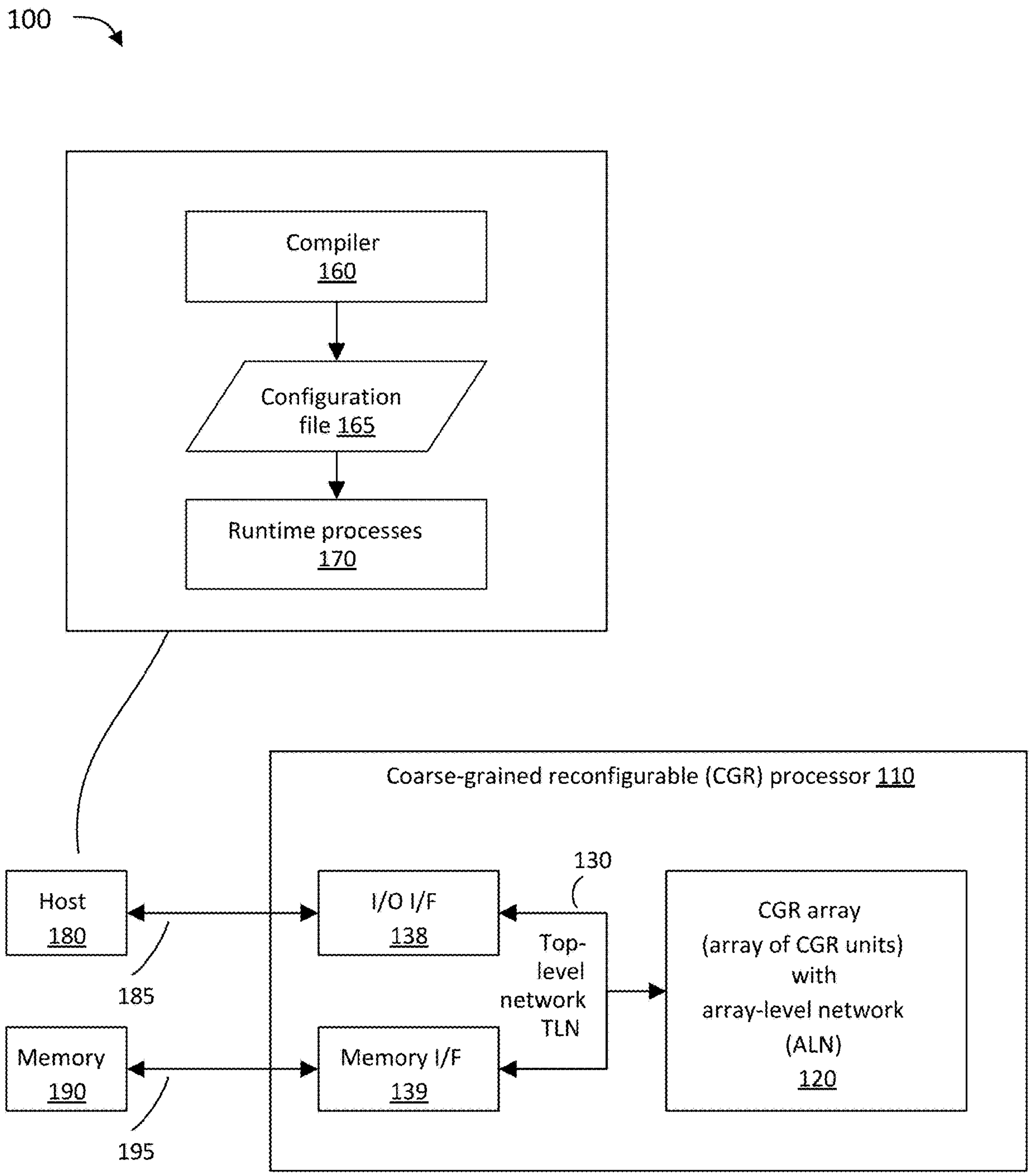
FIG. 1 illustrates an example system including a coarse-grained reconfigurable (CGR) processor, a host, and a memory.

The following detailed description is made with reference to the figures. Example implementations are described to illustrate the technology disclosed, not to limit its scope, which is defined by the claims. Those of ordinary skill in the art will recognize a variety of equivalent variations on the description that follows.

FIGS. 1-7E depict at least one example of an environment wherein the disclosed technology may be deployed while FIGS. 8-14B depict details on various examples of the disclosed technology.

Traditional compilers translate human-readable computer source code into machine code that can be executed on a Von Neumann computer architecture. In this architecture, a processor serially executes instructions in one or more threads of software code. The architecture is static, and the compiler does not determine how execution of the instructions is pipelined, or which processor or memory takes care of which thread. Thread execution is asynchronous, and safe exchange of data between parallel threads is not supported.

High-level programs for machine learning (ML) and artificial intelligence (AI) may require massively parallel computations, where many parallel and interdependent threads (meta-pipelines) exchange data. Such programs are ill-suited for execution on Von Neumann computers. They require architectures that are optimized for parallel processing, such as coarse-grained reconfigurable (CGR) architectures (CGRAs) or graphic processing units (GPUs). The ascent of ML, AI, and massively parallel architectures places new requirements on compilers, including how computation graphs, and in particular dataflow graphs, are pipelined, which operations are assigned to which compute units, how data is routed between various compute units and memory, and how synchronization is controlled particularly when a dataflow graph includes one or more nested loops, whose execution time varies dependent on the data being processed.

Terminology

As used herein, the phrase one of should be interpreted to mean exactly one of the listed items. For example, the phrase "one of A, B, and C" should be interpreted to mean any of: only A, only B, or only C.

As used herein, the phrases at least one of and one or more of should be interpreted to mean one or more items. For example, the phrase "at least one of A, B, and C" or the phrase "at least one of A, B, or C" should be interpreted to mean any combination of A, B, and/or C. The phrase "at least one of A, B, and C" means at least one of A and at least one of B and at least one of C.

Unless otherwise specified, the use of ordinal adjectives first, second, third, etc., to describe an object, merely refers to different instances or classes of the object and does not imply any ranking or sequence.

The following terms or acronyms used herein are defined at least in part as follows:

AGCU—address generator (AG) and coalescing unit (CU).

AI—artificial intelligence.

AIR—arithmetic or algebraic intermediate representation.

ALN—array-level network.

Buffer—an intermediate storage of data.

CGR—coarse-grained reconfigurable. A property of, for example, a system, a processor, an architecture (see CGRA), an array, or a unit in an array. This property distinguishes the system, etc., from field-programmable gate arrays (FPGAs), which can implement digital circuits at the gate level and are therefore fine-grained configurable.

CGRA—coarse-grained reconfigurable architecture. A data processor architecture that includes one or more arrays (CGR arrays) of CGR units.

Compiler—a translator that processes statements written in a programming language to machine language instructions for a computer processor. A compiler may include multiple stages to operate in multiple steps. Individual stages may create or update an intermediate representation (IR) of the translated statements. Compiler stages are illustrated with reference to FIG. 6.

Computation graph—some algorithms can be represented as computation graphs. As used herein, computation graphs are a type of directed graphs comprising nodes that represent mathematical operations/expressions and edges that indicate dependencies between the operations/expressions. For example, with machine learning (ML) algorithms, input layer nodes assign variables, output layer nodes represent algorithm outcomes, and hidden layer nodes perform operations on the variables. Edges represent data (e.g., scalars, vectors, tensors) flowing between operations. In addition to dependencies, the computation graph reveals which operations and/or expressions can be executed concurrently.

CGR unit—a circuit that can be configured and reconfigured to locally store data (e.g., a memory unit or a PMU), or to execute a programmable function (e.g., a compute unit or a PCU). A CGR unit includes hardwired functionality that performs a limited number of functions used in computation graphs and dataflow graphs. Further examples of CGR units include a CU and an AG, which may be combined in an AGCU. Some implementations include CGR switches, whereas other implementations may include regular switches.

CU—coalescing unit.

Data Flow Graph—a computation graph that includes one or more loops that may be nested, and wherein nodes can send messages to nodes in earlier layers to control the dataflow between the layers.

Datapath—a collection of functional units that perform data processing operations. The functional units may include memory, multiplexers, ALUs, SIMDs, multipliers, registers, buses, etc.

FCMU—fused compute and memory unit—a circuit that includes both a memory unit and a compute unit.

Graph—a collection of nodes connected by edges. Nodes may represent various kinds of items or operations, dependent on the type of graph. Edges may represent relationships, directions, dependencies, etc.

IC—integrated circuit—a monolithically integrated circuit, i.e., a single semiconductor die which may be delivered as a bare die or as a packaged circuit. For the purposes of this document, the term integrated circuit also includes packaged circuits that include multiple semiconductor dies, stacked dies, or multiple-die substrates. Such constructions are now common in the industry, produced by the same supply chains, and for the average user often indistinguishable from monolithic circuits.

Logical CGR array or logical CGR unit—a CGR array or a CGR unit that is physically realizable, but that may not have been assigned to a physical CGR array or to a physical CGR unit on an IC.

Meta-pipeline—a subgraph of a computation graph that includes a producer operator providing its output as an input to a consumer operator to form a pipeline. A meta-pipeline may be nested within another meta-pipeline, that is, producer operators and consumer operators may include other meta-pipelines.

ML—machine learning.

PCU—pattern compute unit—a compute unit that can be configured to repetitively perform a sequence of operations.

PEF—processor-executable format—a file format suitable for configuring a configurable data processor.

Pipeline—a staggered flow of operations through a chain of pipeline stages. The operations may be executed in parallel and in a time-sliced fashion. Pipelining increases overall instruction throughput. CGR processors may include pipelines at different levels. For example, a compute unit may include a pipeline at the gate level to enable correct timing of gate-level operations in a synchronous logic implementation of the compute unit, and a meta-pipeline at the graph execution level (typically a sequence of logical operations that are to be repetitively executed) that enables correct timing and loop control of node-level operations of the configured graph. Gate-level pipelines are usually hard wired and unchangeable, whereas meta-pipelines are configured at the CGR processor, CGR array level, and/or GCR unit level.

Pipeline Stages—a pipeline is divided into stages that are coupled with one another to form a pipe topology.

PMU—pattern memory unit—a memory unit that can store data according to a programmed pattern.

PNR—place and route—the assignment of logical CGR units and associated processing/operations to physical CGR units in an array, and the configuration of communication paths between the physical CGR units.

RAIL—reconfigurable dataflow processor (RDP) abstract intermediate language.

CGR Array—an array of CGR units, coupled with each other through an array-level network (ALN), and coupled with external elements via a top-level network (TLN). A CGR array can physically implement the nodes and edges of a dataflow graph.

SIMD-single-instruction multiple-data—an arithmetic logic unit (ALU) that simultaneously performs a single programmable operation on multiple data elements delivering multiple output results.

TLIR—template library intermediate representation.

TLN—top-level network.

Implementations

The architecture, configurability and dataflow capabilities of an array of CGR units enable increased compute power that supports both parallel and pipelined computation. A CGR processor, which includes one or more CGR arrays (arrays of CGR units), can be programmed to simultaneously execute multiple independent and interdependent dataflow graphs. To enable simultaneous execution, the dataflow graphs may need to be distilled from a high-level program and translated to a configuration file for the CGR processor. A high-level program is source code written in programming languages like Spatial, Python, C++, and C, and may use computation libraries for scientific computing, ML, AI, and the like. The high-level program and referenced libraries can implement computing structures and algorithms of machine learning models like AlexNet, VGG Net, GoogleNet, ResNet, ResNeXt, RCNN, YOLO, SqueezeNet, SegNet, GAN, BERT, ELMo, USE, Transformer, and Transformer-XL.

Translation of high-level programs to executable bit files is performed by a compiler. See, for example, FIGS. 6 and 7A-7E. While traditional compilers sequentially map operations to processor instructions, typically without regard to pipeline utilization and duration (a task usually handled by the hardware), an array of CGR units requires mapping operations to processor instructions in both space (for parallelism) and time (for synchronization of interdependent computation graphs or dataflow graphs). This requirement implies that a compiler for a CGRA must decide which operation of a computation graph or dataflow graph is assigned to which of the CGR units, and how both data and, related to the support of dataflow graphs, control information flows among CGR units, and to and from external hosts and storage. This process, known as "place and route", is one of many new challenges posed to compilers for arrays of CGR units.

FIG. 1 illustrates an example coarse-grained reconfigurable architecture (CGRA) system 100 including a coarse-grained reconfigurable (CGR) processor 110 a compiler 160, runtime processes 170, a host 180, and a memory 190. CGR processor 110 includes a CGR array such as a CGR array 120. CGR array 120 includes an array of configurable units in an array level network. CGR processor 110 further includes an IO interface 138 and a memory interface 139. CGR array 120 is coupled with IO interface 138 and memory interface 139 through a data bus 130, which may be part of a top-level network (TLN). Host 180 communicates with IO interface 138 using a system data bus 185, and memory interface 139 communicates with memory 190 using a memory bus 195. A configurable unit in the CGR array 120 may comprise a compute unit or a memory unit. A configurable unit in the CGR array 120 may also comprise a pattern memory unit (PMU), a pattern compute unit (PCU), or a fused-compute memory unit (FCMU). Further examples include a coalescing unit (CU) and an address generator (AG), which may be combined in an AGCU. A configurable unit may also be reconfigurable.

The configurable units in the CGR array 120 may be connected with an array-level network (ALN) to provide the circuitry for execution of a computation graph or a dataflow graph that may have been derived from a high-level program with user algorithms and functions. The high-level program may include a set of procedures, such as learning or inferencing in an artificial intelligence (AI) or machine learning (ML) system. More specifically, the high-level program may include applications, graphs, application graphs, user applications, computation graphs, control flow graphs, dataflow graphs, models, deep learning applications, deep learning neural networks, programs, program images, jobs, tasks and/or any other procedures and functions that may need serial and/or parallel processing. In some implementations, execution of the graph(s) may involve using multiple CGR processors 110. In some implementations, CGR processor 110 may include one or more ICs. In other implementations, a single IC may span multiple CGR processors 110. In further implementations, CGR processor 110 may include multiple arrays of configurable units 120.

Host 180 may be, or include, a computer such as further described with reference to FIG. 2. Host 180 runs runtime processes 170, as further referenced herein, and may also be used to run computer programs, such as compiler 160 further described herein with reference to FIG. 9. In some implementations, compiler 160 may run on a computer that is similar to the computer described with reference to FIG. 2 but separate from host 180.

CGR processor 110 may accomplish computational tasks by executing a configuration file 165 (for example, a PEF file). Configuration file 165 may comprise a processor-executable format file suitable for configuring a CGR array 120 of a CGR processor 110. For the purposes of this description, a configuration file corresponds to a dataflow graph, or a translation of a dataflow graph, and may further include initialization data. Compiler 160 compiles the high-level program to provide the configuration file 165. Runtime processes 170 may install the configuration file 165 in CGR processor 110. In some implementations described herein, a CGR array 120 is configured by programming one or more configuration stores with all or parts of the configuration file 165. A single configuration store may be at the level of the CGR processor 110 or the CGR array 120, or a configurable unit may include an individual configuration store. The configuration file 165 may include configuration data for the CGR array 120 and the configurable units in the CGR array 120, and link the computation graph to the CGR array 120. Execution of the configuration file 165 by CGR processor 110 causes the array(s) of configurable units 120 (*s*) to implement the user algorithms and functions in the dataflow graph.

CGR processor 110 can be implemented on a single integrated circuit die or on a multichip module (MCM). An IC can be packaged in a single chip module or a multichip module. An MCM is an electronic package that may comprise multiple IC dies and other devices, assembled into a single module as if it were a single device. The various dies of an MCM may be mounted on a substrate, and the bare dies of the substrate are electrically coupled to the surface or to each other using for some examples, wire bonding, tape bonding or flip-chip bonding.

Figure 2:
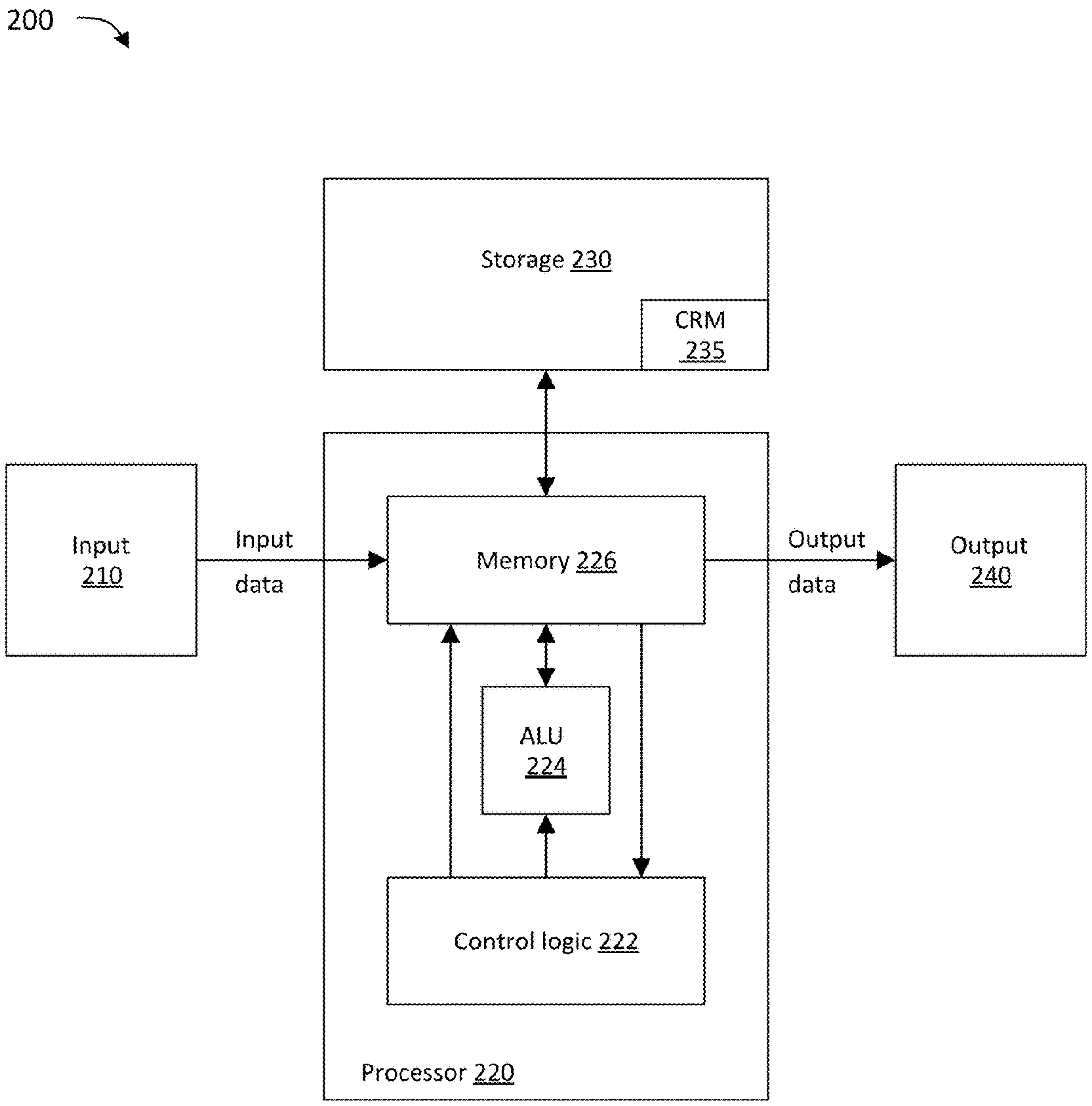
FIG. 2 illustrates an example of a computer, including an input device, a processor, a storage device, and an output device.

FIG. 2 illustrates an example of a computer 200, including an input device 210, a processor 220, a storage device 230, and an output device 240. Although the example computer 200 is drawn with a single processor, other implementations may have multiple processors. Input device 210 may comprise a mouse, a keyboard, a sensor, an input port (for example, a universal serial bus (USB) port), and any other input device known in the art. Output device 240 may comprise a monitor, printer, and any other output device known in the art. Furthermore, part or all of input device 210 and output device 240 may be combined in a network interface, such as a Peripheral Component Interconnect Express (PCIe) interface suitable for communicating with CGR processor 110. Input device 210 is coupled with processor 220 to provide input data, which an implementation may store in memory 226. Processor 220 is coupled with output device 240 to provide output data from memory 226 to output device 240. Processor 220 further includes control logic 222, operable to control memory 226 and arithmetic and logic unit (ALU) 224, and to receive program and configuration data from memory 226. Control logic 222 further controls exchange of data between memory 226 and storage device 230. Memory 226 typically comprises memory with fast access, such as static random-access memory (SRAM), whereas storage device 230 typically comprises memory with slow access, such as dynamic random-access memory (DRAM), flash memory, magnetic disks, optical disks, and any other memory type known in the art. At least a part of the memory in storage device 230 includes a non-transitory computer-readable medium (CRM 235), such as used for storing computer programs.

Figure 3:
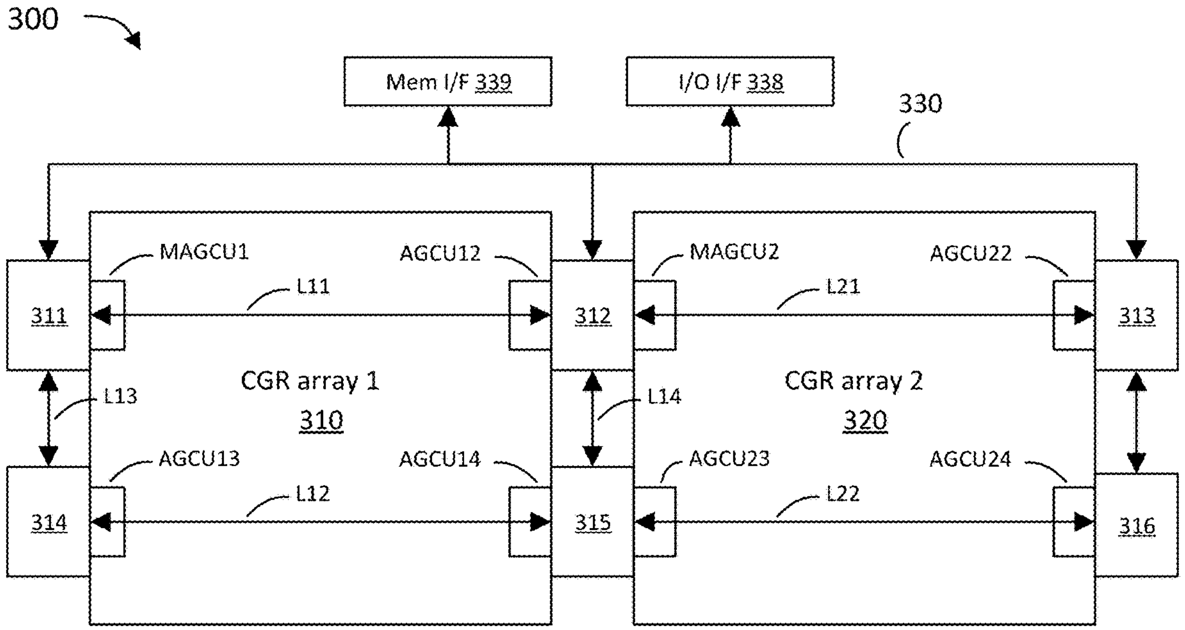
FIG. 3 illustrates example details of a CGR architecture including a top-level network (TLN) and two CGR arrays.

FIG. 3 illustrates example details of a CGR architecture 300 including a top-level network (TLN 330) and two CGR arrays (CGR array 310 and CGR array 320). A CGR array comprises an array of CGR units (e.g., PMUs, PCUs, FCMUs) coupled via an array-level network (ALN), e.g., a bus system. The ALN is coupled with the TLN 330 through several AGCUs, and consequently with I/O interface 338 (or any number of interfaces) and memory interface 339. Other implementations may use different bus or communication architectures.

Circuits on the TLN in this example include one or more external I/O interfaces, including I/O interface 338 and memory interface 339. The interfaces to external devices include circuits for routing data among circuits coupled with the TLN and external devices, such as high-capacity memory, host processors, other CGR processors, FPGA devices, and so on, that are coupled with the interfaces.

Each depicted CGR array has four AGCUs (e.g., MAGCU1, AGCU12, AGCU13, and AGCU14 in CGR array 310). The AGCUs interface the TLN to the ALNs and route data from the TLN to the ALN or vice versa.

One of the AGCUs in each CGR array in this example is configured to be a master AGCU (MAGCU), which includes an array configuration load/unload controller for the CGR array. The MAGCU1 includes a configuration load/unload controller for CGR array 310, and MAGCU2 includes a configuration load/unload controller for CGR array 320. Some implementations may include more than one array configuration load/unload controller. In other implementations, an array configuration load/unload controller may be implemented by logic distributed among more than one AGCU. In yet other implementations, a configuration load/unload controller can be designed for loading and unloading configuration of more than one CGR array. In further implementations, more than one configuration controller can be designed for configuration of a single CGR array. Also, the configuration load/unload controller can be implemented in other portions of the system, including as a stand-alone circuit on the TLN and the ALN or ALNs.

The TLN is constructed using top-level switches (switch 311, switch 312, switch 313, switch 314, switch 315, and switch 316) coupled with each other as well as with other circuits on the TLN, including the AGCUs, and external I/O interface 338. The TLN includes links (e.g., L11, L12, L21, L22) coupling the top-level switches. Data may travel in packets between the top-level switches on the links, and from the switches to the circuits on the network coupled with the switches. For example, switch 311 and switch 312 are coupled by link L11, switch 314 and switch 315 are coupled by link L12, switch 311 and switch 314 are coupled by link L13, and switch 312 and switch 313 are coupled by link L21. The links can include one or more buses and supporting control lines, including for example a chunk-wide bus (vector bus). For example, the top-level network can include data, request and response channels operable in coordination for transfer of data in any manner known in the art.

Figure 4:
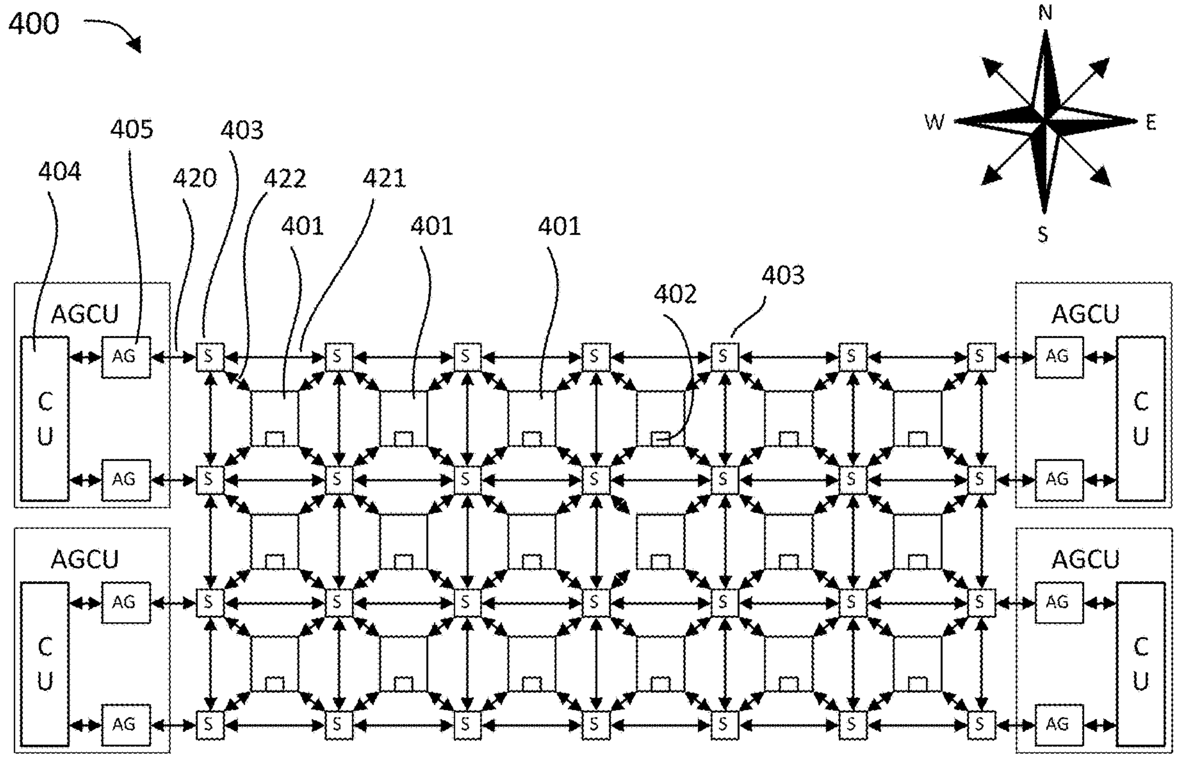
FIG. 4 illustrates an example CGR array, including an array of configurable nodes in an array-level network (ALN).

FIG. 4 illustrates an example CGR array 400, including an array of CGR units in an ALN. CGR array 400 may include several types of CGR unit 401, such as FCMUs, PMUs, PCUs, memory units, and/or compute units. For examples of the functions of these types of CGR units, see Prabhakar et al., "Plasticine: A Reconfigurable Architecture for Parallel Patterns", ISCA 2017 Jun. 24-28, 2017, Toronto, ON, Canada. Each of the CGR units may include a configuration store 402 comprising a set of registers or flip-flops storing configuration data that represents the setup and/or the sequence to run a program, and that can include the number of nested loops, the limits of each loop iterator, the instructions to be executed by individual stages, the source of operands, and the network parameters for the input and output interfaces. In some implementations, each CGR unit 401 comprises an FCMU. In other implementations, the array comprises both PMUs and PCUs, or memory units and compute units, arranged in a checkerboard pattern. In yet other implementations, CGR units may be arranged in different patterns. The ALN includes switch units 403 (S), and AGCUs (each including two address generators 405 (AG) and a shared coalescing unit 404 (CU)). Switch units 403 are connected among themselves via interconnects 421 and to a CGR unit 401 with interconnects 422. Switch units 403 may be coupled with address generators 405 via interconnects 420. In some implementations, communication channels can be configured as end-to-end connections, and switch units 403 are CGR units. In other implementations, switches route data via the available links based on address information in packet headers, and communication channels establish as and when needed.

A configuration file may include configuration data representing an initial configuration, or starting state, of individual CGR units that execute a high-level program with user algorithms and functions. Program load is the process of setting up the configuration stores in the CGR array based on the configuration data to allow the CGR units to execute the high-level program. Program load may also require loading memory units and/or PMUs.

The ALN includes one or more kinds of physical data buses, for example a chunk-level vector bus (e.g., 512 bits of data), a word-level scalar bus (e.g., 32 bits of data), and a control bus. For instance, interconnects 421 between two switches may include a vector bus interconnect with a bus width of 512 bits, and a scalar bus interconnect with a bus width of 32 bits. A control bus can comprise a configurable interconnect that carries multiple control bits on signal routes designated by configuration bits in the CGR array's configuration file. The control bus can comprise physical lines separate from the data buses in some implementations. In other implementations, the control bus can be implemented using the same physical lines with a separate protocol or in a time-sharing procedure.

Physical data buses may differ in the granularity of data being transferred. In one implementation, a vector bus can carry a chunk that includes 16 channels of 32-bit floating-point data or 32 channels of 16-bit floating-point data (i.e., 512 bits) of data as its payload. A scalar bus can have a 32-bit payload and carry scalar operands or control information. The control bus can carry control handshakes such as tokens and other signals. The vector and scalar buses can be packet-switched, including headers that indicate a destination of individual packets and other information such as sequence numbers that can be used to reassemble a file when the packets are received out of order. Individual packet headers can contain a destination identifier that identifies the geographical coordinates of the destination switch unit (e.g., the row and column in the array), and an interface identifier that identifies the interface on the destination switch (e.g., North, South, East, West, etc.) used to reach the destination unit.

A CGR unit 401 may have four ports (as drawn) to interface with switch units 403, or any other number of ports suitable for an ALN. Individual ports may be suitable for receiving and transmitting data, or a port may be suitable for only receiving or only transmitting data.

A switch unit, as shown in the example of FIG. 4, may have eight interfaces. The North, South, East and West interfaces of a switch unit may be used for links between switch units using interconnects 421. The Northeast, Southeast, Northwest and Southwest interfaces of a switch unit may each be used to make a link with an FCMU, PCU or PMU instance using one of the interconnects 422. Two switch units in each CGR array quadrant have links to an AGCU using interconnects 420. The AGCU coalescing unit arbitrates between the AGs and processes memory requests. Individual interfaces of a switch unit can include a vector interface, a scalar interface, and a control interface to communicate with the vector network, the scalar network, and the control network. In other implementations, a switch unit may have any number of interfaces.

During execution of a graph or subgraph in a CGR array after configuration, data can be sent via one or more switch units and one or more links between the switch units to the CGR units using the vector bus and vector interface(s) of the one or more switch units on the ALN. A CGR array may comprise at least a part of CGR array 400, and any number of other CGR arrays coupled with CGR array 400.

A data processing operation implemented by CGR array configuration may comprise multiple graphs or subgraphs specifying data processing operations that are distributed among and executed by corresponding CGR units (e.g., FCMUs, PMUs, PCUs, AGs, and CUs).

Figure 5:
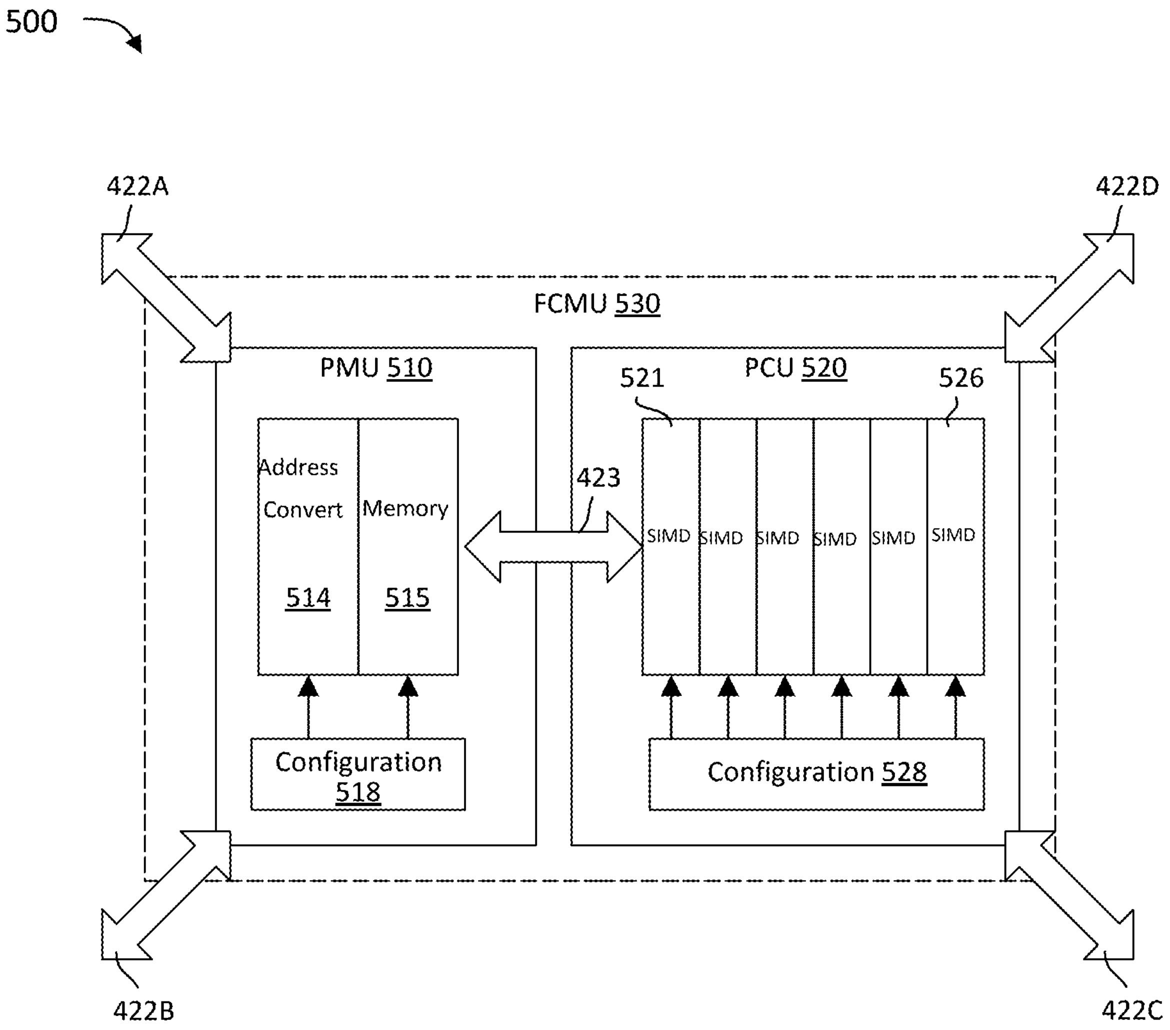
FIG. 5 illustrates an example of a pattern memory unit (PMU) and a pattern compute unit (PCU), which may be combined in a fused-control memory unit (FCMU).

FIG. 5 illustrates an example 500 of a PMU 510 and a PCU 520, which may be combined in an FCMU 530. PMU 510 may be directly coupled to PCU 520, or optionally via one or more ALN links 423, or optionally via one or more switches. The FCMU 530 may include multiple ALN links, such as northwest ALN link 422A and southwest ALN link 422B, which may connect to PMU 510, and southeast ALN link 422C and northeast ALN link 422D, which may connect to PCU 520. The northwest ALN link 422A, southwest ALN link 422B, southeast ALN link 422C, and northeast ALN link 422D connect to switches 403 as shown in FIG. 4. Each ALN link 422A-D, 423 may include one or more scalar links, one or more vector links, and one or more control links where an individual link may be unidirectional into FCMU 530, unidirectional out of FCMU 530 or bidirectional. FCMU 530 can include FIFOs to buffer data entering and/or leaving the FCMU 530 on the links.

PMU 510 may include an address converter 514, a scratchpad memory 515, and a configuration store 518. scratchpad memory 515 may receive external data, memory addresses, and memory control information (write enable, read enable) via one or more buses included in the ALN. Configuration store 518 may be loaded, for example, from a program running on host 180, as shown in FIG. 1. Configuration store 518 may configure address converter 514 to generate or convert address information for scratchpad memory 515 based on data received through one or more of the ALN links 422A-B, and/or 423. Data received through ALN links 422A-B, and/or 423 may be written into scratchpad memory 515 at addresses provided by address converter 514. Data read from scratchpad memory 515 at addresses provided by address converter 514 may be sent out on one or more of the ALN links 422A-B, and/or 423.

PCU 520 includes two or more processor stages, such as SIMD 521 through SIMD 526, and configuration store 528. The processor stages may include ALUs, or SIMDs, as drawn, or any other reconfigurable stages that can process data. PCU 520 may receive data through ALN links 422C-D, and/or 423, and process the data in the two or more processor stages or store the data in configuration store 528. PCU 520 may produce data in the two or more processor stages, and PCU 520 may transmit the produced data through one or more of the ALN links 422C-D, and/or 423. If the two or more processor stages include SIMDs, then the SIMDs may have a number of lanes of processing equal to the number of lanes of data provided by a vector interconnect of ALN links 422C-D, and/or 423.

PCU 520 may also hold one or more registers (not drawn) for short-term storage of parameters. Short-term storage, for example during one to several clock cycles or unit delays, allows for synchronization of data in the PCU pipeline.

Figure 6:
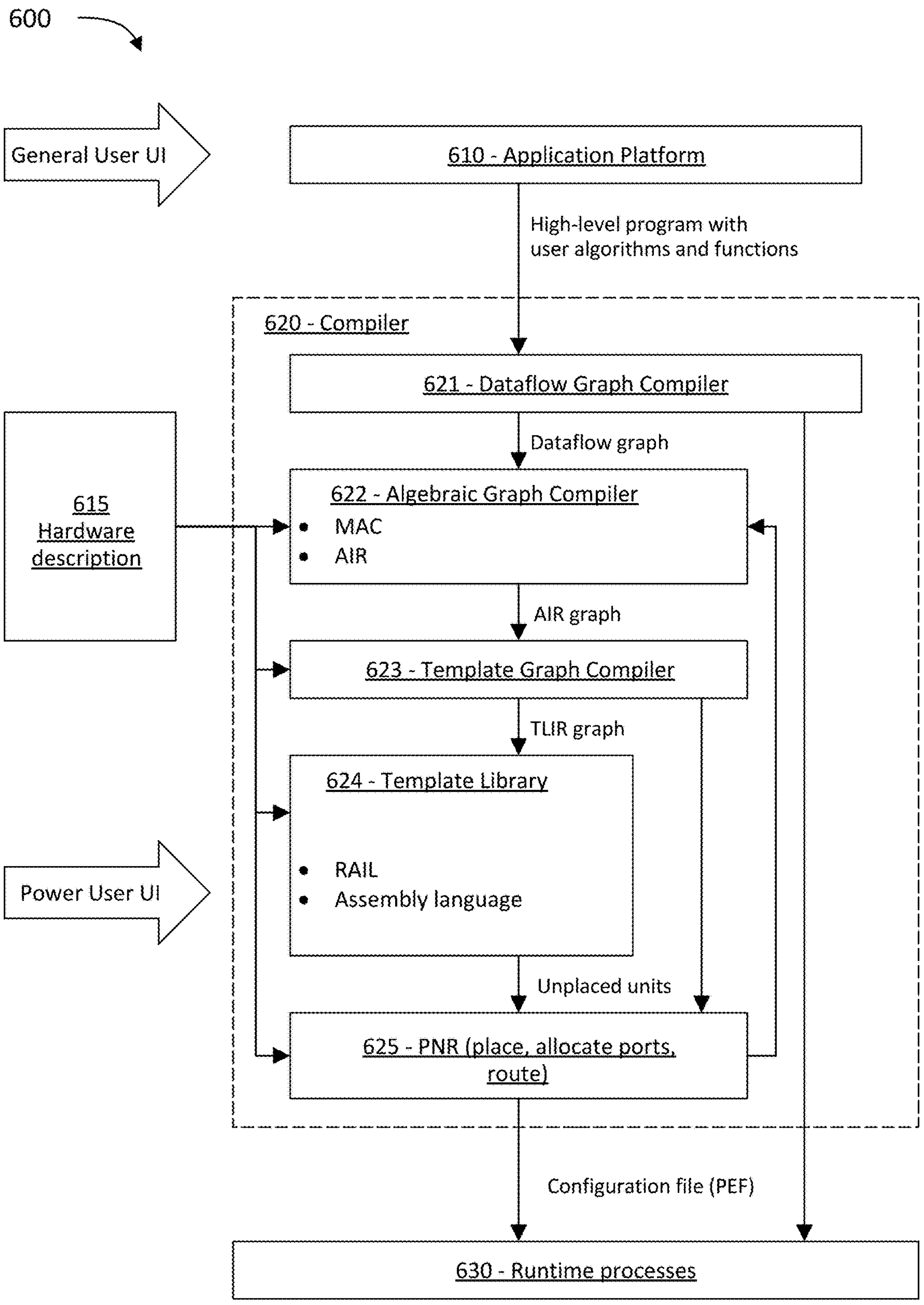
FIG. 6 is a block diagram of a compiler stack implementation suitable for generating a configuration file for a CGR processor.

Referring now to FIG. 6 which is a block diagram of a compiler stack 600 implementation suitable for generating a configuration file for a CGR processor. Referring also to FIGS. 7A-7E which illustrate various representations of an example user program 710 corresponding to various stages of a compiler stack such as the compiler stack 600. As depicted, compiler stack 600 includes several stages to convert a high-level program (e.g., user program 710) with statements 712 that define user algorithms and functions, e.g., algebraic expressions and functions, to configuration data for the CGR units.

Compiler stack 600 may take its input from application platform 610, or any other source of high-level program statements suitable for parallel processing, which provides a user interface for general users. It may further receive hardware description 615, for example defining the physical units in a reconfigurable data processor or CGRA processor. Application platform 610 may include libraries such as PyTorch, TensorFlow, ONNX, Caffe, and Keras to provide user-selected and configured algorithms. The example user program 710 depicted in FIG. 7A comprises statements 712 that invoke various PyTorch functions.

Application platform 610 outputs a high-level program to compiler 620, which in turn outputs a configuration file to the reconfigurable data processor or CGRA processor where it is executed in runtime processes 630. Compiler 620 may include dataflow graph compiler 621, which may handle a dataflow graph, algebraic graph compiler 622, template graph compiler 623, template library 624, and placer and router (PNR) 625. In some implementations, template library 624 includes RDP abstract intermediate language (RAIL) and/or assembly language interfaces for power users.

Dataflow graph compiler 621 converts the high-level program with user algorithms and functions from application platform 610 to one or more dataflow graphs. The high-level program may be suitable for parallel processing, and therefore parts of the nodes of the dataflow graphs may be intrinsically parallel unless an edge in the graph indicates a dependency. Dataflow graph compiler 621 may provide code optimization steps like false data dependency elimination, dead-code elimination, and constant folding. The dataflow graphs encode the data and control dependencies of the high-level program.

Dataflow graph compiler 621 may support programming a reconfigurable data processor at higher or lower-level programming languages, for example from an application platform 610 to C++ and assembly language. In some implementations, dataflow graph compiler 621 allows programmers to provide code that runs directly on the reconfigurable data processor. In other implementations, dataflow graph compiler 621 provides one or more libraries that include predefined functions like linear algebra operations, element-wise tensor operations, non-linearities, and reductions required for creating, executing, and profiling the dataflow graphs on the reconfigurable processors. Dataflow graph compiler 621 may provide an application programming interface (API) to enhance functionality available via the application platform 610.

Algebraic graph compiler 622 may include a model analyzer and compiler (MAC) level that makes high-level mapping decisions for (sub-graphs of the) dataflow graph based on hardware constraints. It may support various application frontends such as Samba, JAX, and TensorFlow/HLO. Algebraic graph compiler 622 may also transform the graphs via autodiff and GradNorm, perform stitching between sub-graphs, interface with template generators for performance and latency estimation, convert dataflow graph operations to AIR operation, perform tiling, sharding (database partitioning) and other operations, and model or estimate the parallelism that can be achieved on the dataflow graphs.

Algebraic graph compiler 622 may further include an arithmetic or algebraic intermediate representation (AIR) stage that translates high-level graph and mapping decisions provided by the MAC level into explicit AIR/Tensor statements 720 and one or more corresponding algebraic graphs 725 as shown in FIG. 7B. In the depicted example, the algebraic graph compiler replaces the Softmax function specified in the user program 710 by its constituent statements/nodes (i.e., exp, sum and div). Key responsibilities of the AIR level include legalizing the graph and mapping decisions of the MAC, expanding data parallel, tiling, metapipe, region instructions provided by the MAC, inserting stage buffers and skip buffers, eliminating redundant operations, buffers and sections, and optimizing for resource use, latency, and throughput.

Template graph compiler 623 may translate AIR statements and/or graphs into TLIR statements 730 and/or graph(s) 735 (see FIG. 7C), optimizing for the target hardware architecture, into unplaced variable-sized units (referred to as logical CGR units) suitable for PNR 625. Meta-pipelines 732 that enable iteration control may be allocated for sections of the TLIR statements and/or corresponding sections of the graph(s) 735. Template graph compiler 623 may add further information (name, inputs, input names and dataflow description) for PNR 625 and make the graph physically realizable through each performed step. Template graph compiler 623 may for example provide translation of AIR graphs to specific model operation templates such as for general matrix multiplication (GeMM). An implementation may convert part or all intermediate representation operations to templates, stitch templates into the dataflow and control flow, insert necessary buffers and layout transforms, generate test data and optimize for hardware use, latency, and throughput.

Implementations may use templates for common operations. Templates may be implemented using assembly language, RAIL, or similar. RAIL is comparable to assembly language in that memory units and compute units are separately programmed, but it can provide a higher level of abstraction and compiler intelligence via a concise performance-oriented domain-specific language for CGR array templates. RAIL enables template writers and external power users to control interactions between logical compute units and memory units with high-level expressions without the need to manually program capacity splitting, register allocation, etc. The logical compute units and memory units also enable stage/register allocation, context splitting, transpose slotting, resource virtualization and mapping to multiple physical compute units and memory units (e.g., PCUs and PMUs).

Template library 624 may include an assembler that provides an architecture-independent low-level programming interface as well as optimization and code generation for the target hardware. Responsibilities of the assembler may include address expression compilation, intra-unit resource allocation and management, making a template graph physically realizable with target-specific rules, low-level architecture-specific transformations and optimizations, and architecture-specific code generation.

Figure 7D:
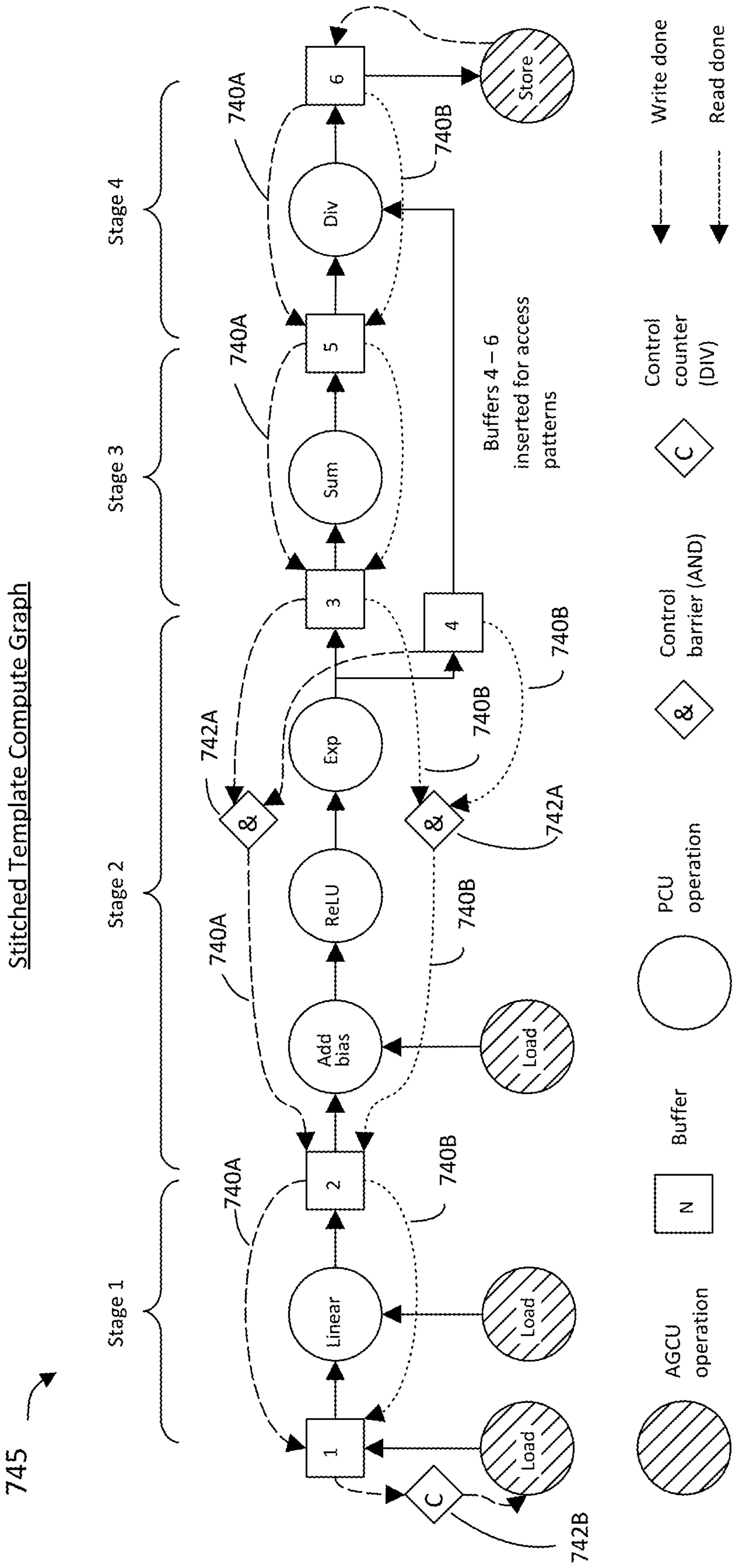

Referring to FIG. 7D, the template graph compiler may also determine the control signals 740 and control gates 742 required to enable the CGR units (whether logical or physical) to coordinate dataflow between the CGR units on the communication fabric of a CGR processor. This process, sometimes referred to as stitching, produces a stitched template compute graph 745 with control signals 740 and control gates 742. In the example depicted in FIG. 7D, the control signals 740 include write done signals 740A and read done signals 740B and the control gates 742 include 'AND' gates 742A and a counting or 'DIV' gate 742B. The control signals 740 and control gates 742 enable coordinated dataflow between the configurable units of CGR processors such as compute units, memory units, and AGCUs.

PNR 625 translates and maps logical (i.e., unplaced physically realizable) CGR units (e.g., the nodes of the logical compute graph 750 shown in FIG. 7E) to a physical layout (e.g., the physical layout 755 shown in FIG. 7E) on the physical chip level e.g., a physical array of CGR units. PNR 625 also determines physical data channels to enable communication among the CGR units and between the CGR units and circuits coupled via the TLN, allocates ports on the CGR units and switches, provides configuration data and initialization data for the target hardware, and produces configuration files, e.g., processor-executable format (PEF) files. It may further provide bandwidth calculations, allocate network interfaces such as AGCUs and virtual address generators (VAGs), provide configuration data that allows AGCUs and/or VAGs to perform address translation, and control ALN switches and data routing. PNR 625 may provide its functionality in multiple steps and may include multiple modules (not shown in FIG. 6) to provide the multiple steps, e.g., a placer, a router, a port allocator, and a PEF file generator. PNR 625 may receive its input data in various ways. For example, it may receive parts of its input data from any of the earlier modules (dataflow graph compiler 621, algebraic graph compiler 622, template graph compiler 623, and/or template library 624). In some implementations, an earlier module, such as template graph compiler 623, may have the task of preparing all information for PNR 625 and no other units provide PNR input data directly.

Further implementations of compiler 620 provide for an iterative process, for example by feeding information from PNR 625 back to an earlier module, so that the earlier module can execute a new compilation step in which it uses physically realized results rather than estimates of or placeholders for physically realizable circuits. For example, PNR 625 may feed information regarding the physically realized circuits back to algebraic graph compiler 622.

Memory allocations represent the creation of logical memory spaces in on-chip and/or off-chip memories for data required to implement the dataflow graph, and these memory allocations are specified in the configuration file. Memory allocations define the type and the number of hardware circuits (functional units, storage, or connectivity components). Main memory (e.g., DRAM) may be off-chip memory, and scratchpad memory (e.g., SRAM) is on-chip memory inside a CGR array. Other memory types for which the memory allocations can be made for various access patterns and layouts include cache, read-only look-up tables (LUTs), serial memories (e.g., FIFOs), and register files.

Compiler 620 binds memory allocations to unplaced memory units and binds operations specified by operation nodes in the dataflow graph to unplaced compute units, and these bindings may be specified in the configuration data. In some implementations, compiler 620 partitions parts of a dataflow graph into memory subgraphs and compute subgraphs, and specifies these subgraphs in the PEF file. A memory subgraph may comprise address calculations leading up to a memory access. A compute subgraph may comprise all other operations in the parent graph. In one implementation, a parent graph is broken up into multiple memory subgraphs and exactly one compute subgraph. A single parent graph can produce one or more memory subgraphs, depending on how many memory accesses exist in the original loop body. In cases where the same memory addressing logic is shared across multiple memory accesses, address calculation may be duplicated to create multiple memory subgraphs from the same parent graph.

Compiler 620 generates the configuration files with configuration data (e.g., a bit stream) for the placed positions and the routed data and control networks. In one implementation, this includes assigning coordinates and communication resources of the physical CGR units by placing and routing unplaced units onto the array of CGR units while maximizing bandwidth and minimizing latency.

A first example of accelerated deep learning is using a deep learning accelerator implemented in a CGRA to train a neural network. A second example of accelerated deep learning is using the deep learning accelerator to operate a trained neural network to perform inferences. A third example of accelerated deep learning is using the deep learning accelerator to train a neural network and subsequently perform inference with any one or more of the trained neural network, information from the trained neural network, and a variant of the same.

Examples of neural networks include fully connected neural networks (FCNNs), recurrent neural networks (RNNs), graph neural networks (GNNs), convolutional neural networks (CNNs), graph convolutional networks (GCNs), long short-term memory (LSTM) networks, autoencoders, deep belief networks, and generative adversarial networks (GANs).

An example of training a neural network is determining one or more weights associated with the neural network, such as by back-propagation in a deep learning accelerator. An example of making an inference is using a trained neural network to compute results by processing input data using the weights associated with the trained neural network. As used herein, the term 'weight' is an example of a 'parameter' as used in various forms of neural network processing. For example, some neural network learning is directed to determining parameters (e.g., through back-propagation) that are usable for performing neural network inferences.

A neural network processes data according to a dataflow graph comprising layers of neurons. Example layers of neurons include input layers, hidden layers, and output layers. Stimuli (e.g., input data) are received by an input layer of neurons and the computed results of the dataflow graph (e.g., output data) are provided by an output layer of neurons. Example hidden layers include rectified linear unit (ReLU) layers, fully connected layers, recurrent layers, graphical network layers, long short-term memory layers, convolutional layers, kernel layers, dropout layers, and pooling layers. A neural network may be conditionally and/or selectively trained. After being trained, a neural network may be conditionally and/or selectively used for inference.

Examples of ICs, or parts of ICs, that may be used as deep learning accelerators, are processors such as central processing unit (CPUs), CGR processor ICs, graphics processing units (GPUs), FPGAs, ASICs, application-specific instruction-set processor (ASIP), and digital signal processors (DSPs). The disclosed technology implements efficient distributed computing by allowing an array of accelerators (e.g., reconfigurable processors) attached to separate hosts to directly communicate with each other via buffers.

Figure 8:
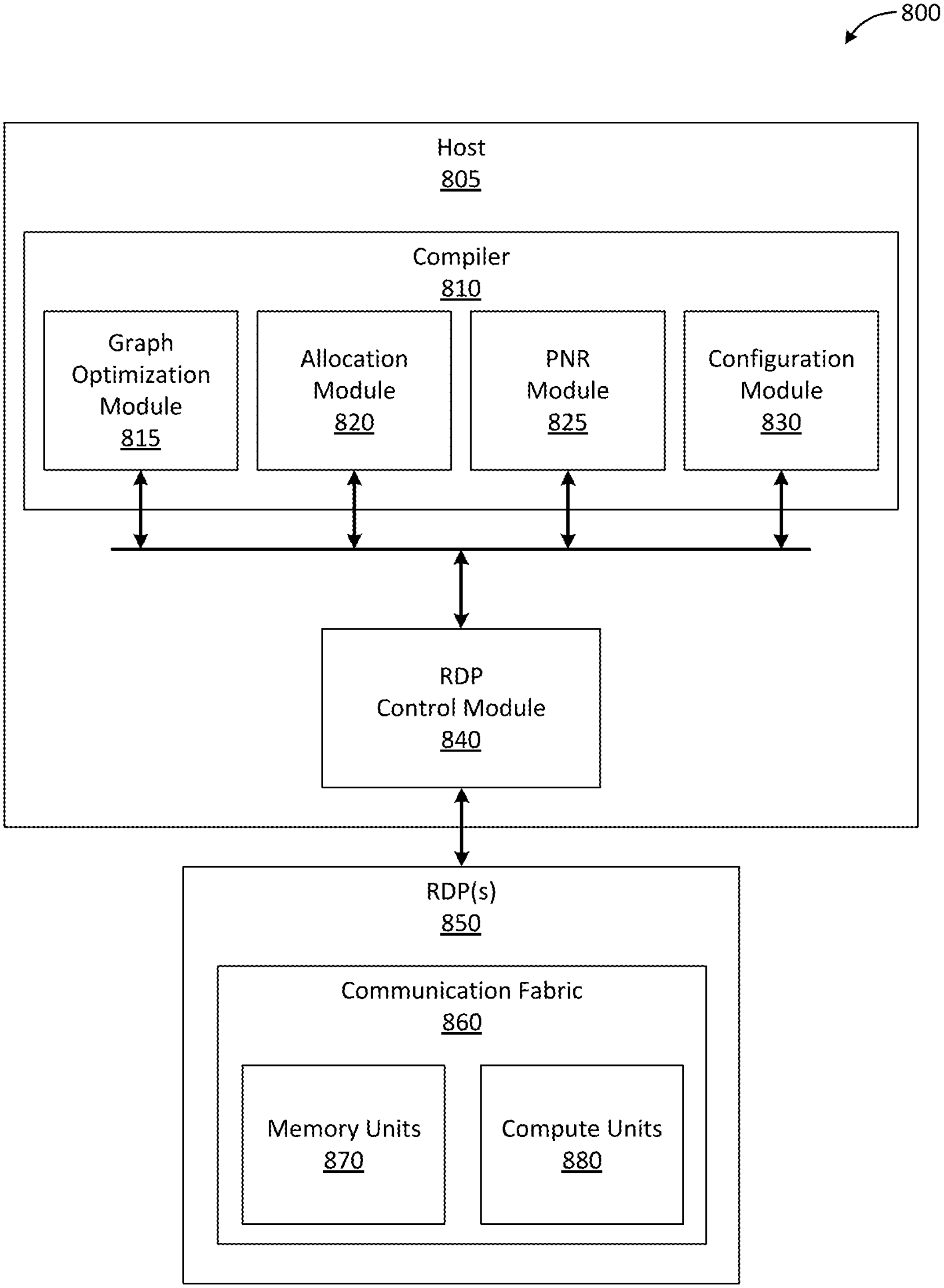
FIG. 8 is a block diagram illustrating one example of a CGR dataflow computing system.

FIG. 8 is a block diagram illustrating one example of a CGR dataflow computing system 800. As depicted, the CGR dataflow computing system 800 includes a graph optimization module 815, an allocation module 820, a place and route module 825, a configuration module 830, a reconfigurable dataflow processor (RDP) control module 840, and one or more RDPs 850 comprising a communication fabric 860, memory units 870 and compute units 880. The CGR dataflow computing system 800 enables evaluation and selection of template configurations as well as placement, routing, configuration, and deployment of those configured templates on the configurable units of the (coarse-grained) reconfigurable dataflow processors (RDPs) 850.

The depicted modules 815-840 may reside within, or be available to (e.g., within a library), a compiler 810 that executes on a host 805 and compiles computing tasks for execution on the RDPs 850. The computing task may be represented with a compute graph and/or code statements that indicate the mathematical operations that are to be executed. The graph optimization module 815 may analyze intermediate representations of a computing task and may balance the total stage buffer depth of two or more dataflow paths in a section to reduce back pressure, reduce latency, increase throughput, and/or optimize resource utilization while maintaining the intended results of the computing task.

The allocation module 820 may allocate virtual compute units and memory units to the computing task or a portion thereof and may determine the number of compute units and the number of memory units required to support an operation. The allocation module 820 may function in conjunction with a partitioner (not shown) that partitions the compute graph into executable sub-graphs and inserts virtual memory units (i.e., buffers or stage buffers) into the compute graph that enable dataflow execution of the sub-graphs on coarse-grained reconfigurable dataflow processors such as the RDPs 850.

The place and route module 825 may generate multiple placement graph options corresponding to the computing task and select the placement graph that best meets the objectives and resources of the RDPs 850. For example, in some situations, throughput may be the primary objective, while in other situations, minimizing consumed resources may be the primary objective. The placement graphs may specify physical compute units, memory units and switch units that correspond to the virtual units of the executable sub-graph. To reduce communication distance and latency, the specified physical compute units, memory units, and switch units may be neighbors in a computing grid on an RDP 850.

The configuration module 830 may generate configuration information for the configuration units specified in the selected placement graphs. The RDP control module 840 may communicate the configuration information to the RDPs 850 and initiate dataflow in the computing grid. The communication fabric 860 may comprise switch units (not shown) that enable communication between the RDP control module 840 and memory units 870 and compute units 880 within the RDP(s) 850. One of skill in the art will appreciate that the placement graphs specified for execution may be relocated at runtime to a currently available RDP and/or a currently available region with a computing grid (e.g., tile region) of an RDP. The relocation may preserve the relative positions and connectivity of the configurable units specified by the placement graphs and enable concurrent execution of multiple placement graphs.

Figure 9:
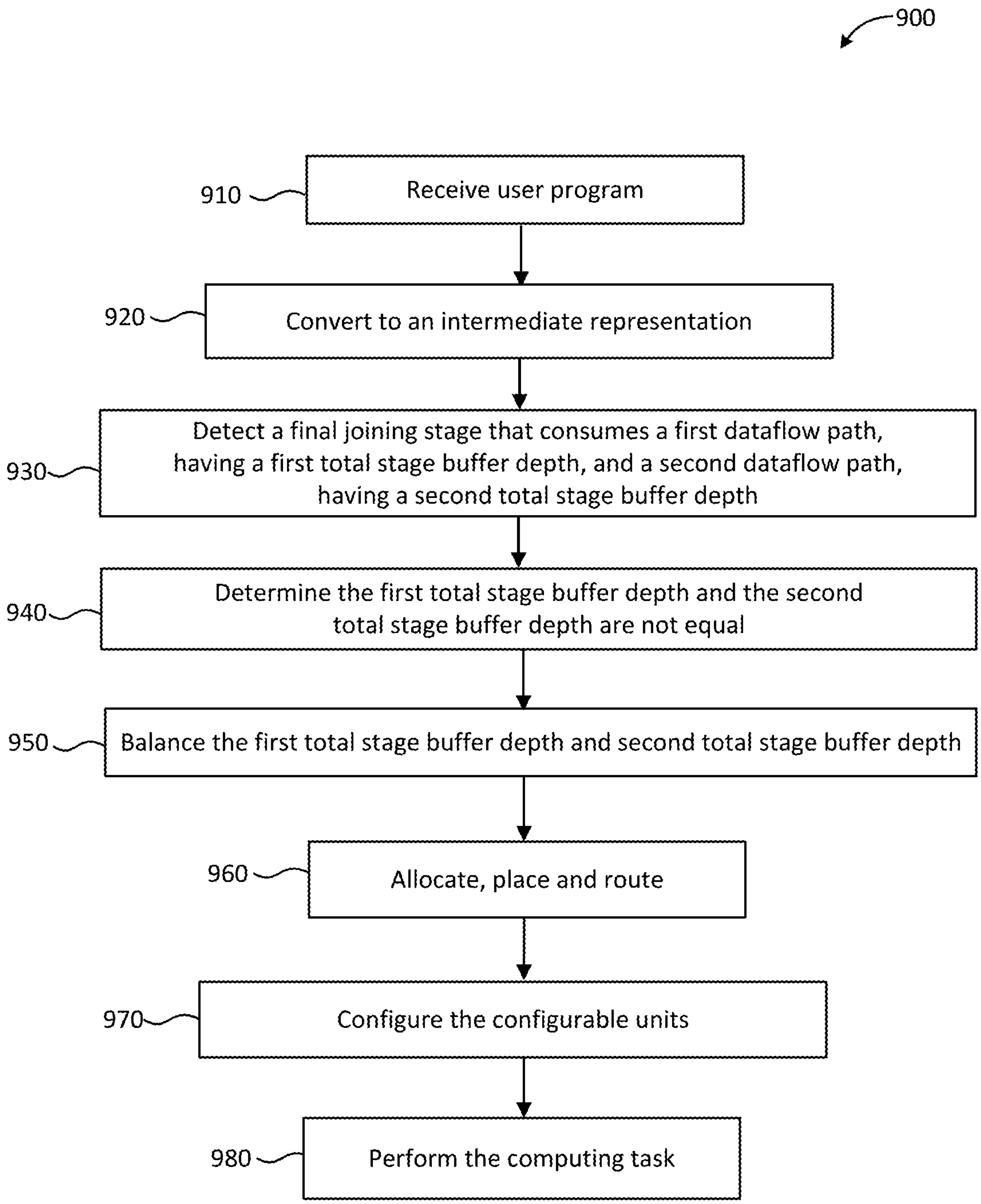
FIG. 9 is a flowchart of one example of a graph optimization for balancing stage buffers.

FIG. 9 is a flowchart of one example of a graph optimization method 900 for a CGR dataflow computing system. As depicted, the graph optimization method 900 includes receiving (910) a user program, converting (920) to an intermediate representation, detecting (930) a final joining stage that consumes a first dataflow path having a first total stage buffer depth and a second dataflow path having a second total stage buffer depth, determining (940) the first and second total stage buffer depths are not equal, balancing (950) the first and second total stage buffer depths, allocating, placing, and routing (960) configurable units, configuring (970) the configurable units, and performing (980) the computing task. The graph optimization method 900 enables improved compute utilization, alleviates place and route issues, and contributes to overall performance improvement in a CGR dataflow computing system.

Receiving (910) a user program may include receiving a user program for execution on a reconfigurable dataflow computing system. The reconfigurable dataflow computing system may comprise a grid of compute units and a grid of memory units interconnected with a switching array. The user program can include multiple tensor-based algebraic expressions.

Converting (920) to an intermediate representation may include converting tensor-based algebraic expressions to an intermediate representation comprising one or more compute subgraphs. Each compute subgraph can be divided into one or more section cuts. Each section cut may be preceded by and/or followed by an off-chip memory storage (e.g. DRAM). Each section cut can include one or more (pipeline) stages. Each stage may be preceded by and/or followed by a stage buffer. A stage may include one or more computation nodes and/or one or more buffers within the stage. Each computation node may comprise one or more logical operations executable via dataflow.

Detecting (930) a final joining stage in the section cut may include identifying a first dataflow path and a second dataflow path that are consumed by the final joining stage in the section cut. The first dataflow path may have a first total stage buffer depth, and the second dataflow path may have a second total stage buffer depth. In some implementations, readied sample/tensor data from an immediately adjacent upstream off-chip memory may be broadcasted downstream to the first dataflow path and the second dataflow path in the section cut.

Determining (940) the first total stage buffer depth and the second total stage buffer depth are not equal may include comparing the first total stage buffer depth of the first dataflow path and the second total stage buffer depth of the second dataflow path. After comparing, the first and second total stage buffer depths are determined to be not equal if their respective total stage buffer depths are not the same or do not have equivalent total stage buffer depths.

Balancing (950) the first total stage buffer depth and the second total stage buffer depth may include one or more steps to ensure that the first total stage buffer depth and the second total stage buffer depth are equal. As will be discussed further in following sections, balancing the first and second total stage buffer depths may include (i) tuning one or more stage buffers and/or (ii) inserting one or more whole stage buffers. One having skill in the art will appreciate that each section cut having a set of balanced total stage buffer depths will greatly improve throughput and performance in a reconfigurable compute grid.

Allocating, placing and routing (960) configurable units may include placing memory units and compute units and routing connections that enable dataflow between the memory units and compute units.

Configuring (970) the configurable units may include configuring the reconfigurable units of the reconfigurable computing grid. In conjunction therewith, configuring (970) the configurable units may include determining the configuration information for configurable units of the reconfigurable computing grid and communicating the configuration information to one or more RDPs 850 (e.g., via the RDP control module 840). Performing (980) the computing task may include initiating dataflow within the reconfigurable computing grid via the RDP control module 840.

Figure 10:
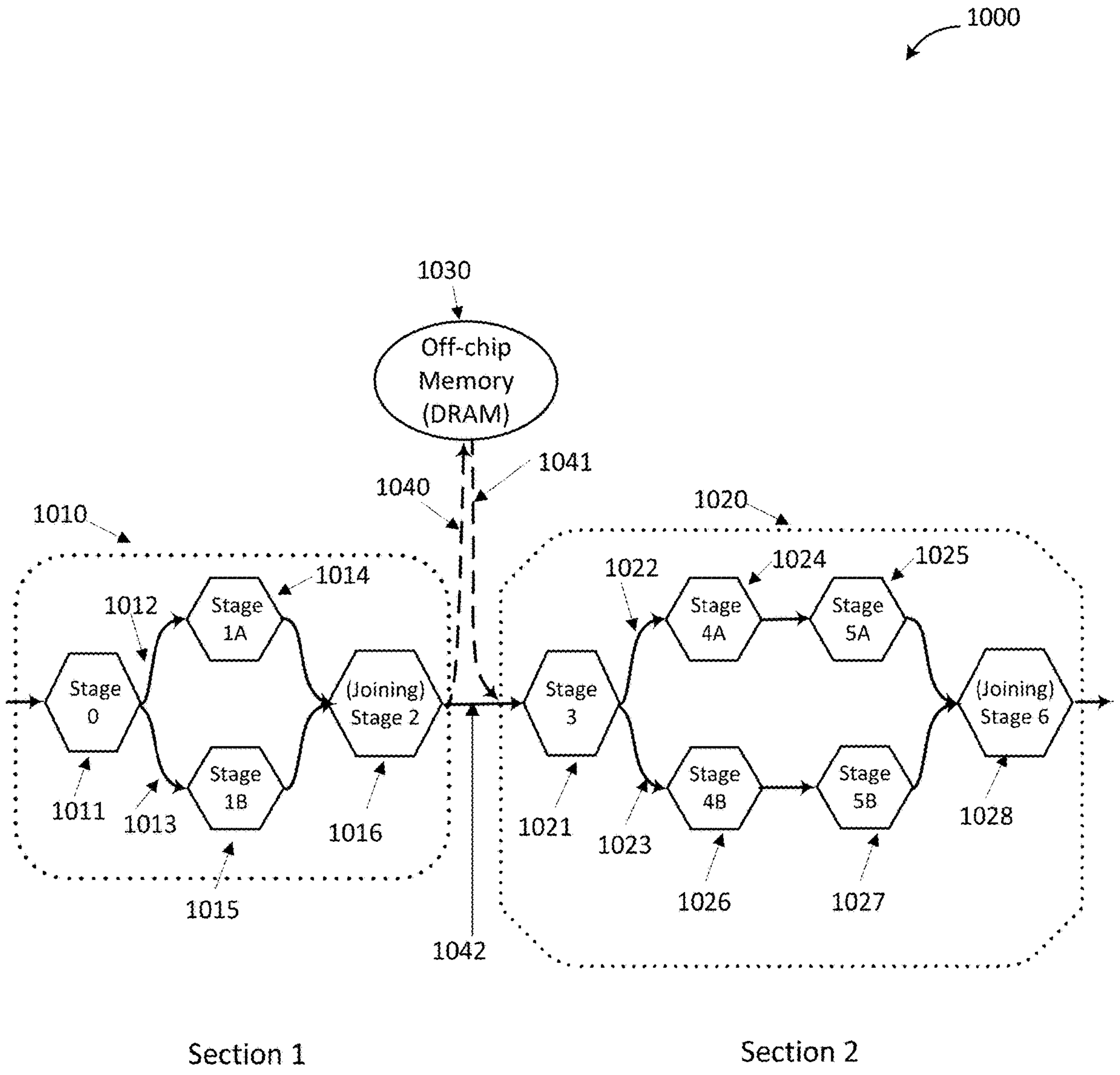
FIG. 10 depicts one example of a set of section cuts, and the stage buffer balancing may be applied to each section cut.

FIG. 10 shows one example of a set of section cuts 1000 of a compute subgraph that may be utilized by stage buffer depth balancing of the CGR dataflow computing system, as disclosed herein. In some embodiments, the compute subgraph may be sequentially divided into a set of section cuts 1000 that includes a first section cut 1010 and a second section cut 1020. One with skill in the art may recognize that deploying one or more sequential section cuts to the reconfigurable dataflow computing system allows for more efficient dataflow and higher throughput of large model processing.

In some embodiments, a compute graph is an acyclic directed graph that may be divided into one or more compute subgraphs, to generate a set of compute subgraphs. Each compute subgraph may include one or more layers. In some implementations, each compute subgraph layer forms one or more section cuts. The compute subgraph layer can be vertically sliced, sequentially, to generate one or more sequential section cuts. Dataflow across the sequential section cuts may proceed from an upstream section cut toward a downstream section cut. Stage buffer balancing, as depicted herein, may be applied to a single section cut in some implementations or, in other implementations, to more than one section cut. A sequentially first section cut 1010 may provide directed dataflow to a sequentially second section cut 1020.

In some implementations, each section cut is preceded by and/or followed by an off-chip memory storage (e.g. DRAM at 1030). Each section cut can include one or more stages, wherein each stage may have one or more computation nodes and/or one or more buffers (i.e., intra-stage buffers). Each computation node may comprise one or more logical operations executable via dataflow, for example, through one or more PCUs within the grid of compute units. Each stage may be preceded by and/or followed by a stage buffer (i.e., inter-stage buffers), wherein dataflow through each stage buffer may be controlled by one or more memory units (for example, PMUs) within the grid of memory units. Each stage buffer may be implemented by one or more memory units within the grid of memory units.

In some embodiments, the first section cut 1010 may provide intermediate data to a downstream adjacent off-chip memory 1030, via dataflow path 1040. Off-chip memory 1030 may store intermediate data, and then off-chip memory 1030 may provide the intermediate data to second section cut 1020 via dataflow path 1041. In other embodiments, the first section cut 1010 may provide data directly to downstream second section cut 1020, via dataflow path 1042 that connects the two section cuts, 1010 and 1020.

An exemplary first section cut 1010 may include stage 1011 (Stage 0) that broadcasts data to a first dataflow path 1012 and a second dataflow path 1013. The first 1012 and second 1013 dataflow paths may each have one or more stages (for example, Stage 1A (1014) and Stage 1B (1015), respectively), each stage preceded by and followed by a stage buffer (stage buffers not depicted). Each stage may comprise one or more compute nodes. For example, compute nodes may comprise any type of computation, such as matrix/tensor addition, multiplication, or any other computations needed to process tensor data. Each dataflow path may execute asynchronously when its respective data inputs are ready, and its respective control dependencies are satisfied.

First dataflow path 1012 and second dataflow path 1013 may join at a final joining stage 1016 (for example, (Joining) Stage 2) in first section cut 1010 (Section 1). For example, the stage buffer depth balancing method described herein may detect final joining stage 1016, may determine the first and second total stage buffer depths for the first 1012 and second 1013 dataflow paths (for example, between final joining stage 1016 and initial shared stage 1011 in first section cut 1010), and may balance the first and second total stage buffer depths of the first 1012 and second 1013 dataflow paths, respectively.

In some exemplary implementations, stage buffer depth balancing may be applied to each section cut, individually. A final joining stage, for example 1016 or 1028, is detected in each section cut. Each section cut may contain an initial shared stage, for example 1011 or 1021. In other implementations (not depicted), the first 1012 and second 1013 dataflow paths may have different initial stages. In other implementations (not depicted), the first 1012 and second 1013 dataflow paths may have an initial shared stage buffer.

Stage buffer depth balancing as described herein may include determining load time. For example, in some implementations, the timing of providing data from off-chip memory 1030 to the start of first dataflow path 1012 (i.e., providing data to an initial stage buffer (not shown) that precedes stage Stage 0 (1011)) is known as a first load time to first dataflow path 1012. The load time for each dataflow path may be distinct and dynamically modified at runtime. Buffer balancing, as described herein, provides that modifying load time at runtime may contribute to balancing the first total stage buffer depth and the second total stage buffer depth.

As depicted in FIG. 10, an initial shared stage 1021 (Stage 3) of the second section cut 1020 (Section 2) may broadcast data to the first dataflow path 1022 and second dataflow path 1023. In other embodiments, data may be broadcasted from the off-chip memory 1030 to the first 1022 and second 1023 dataflow paths of the second section cut 1020, each dataflow path receiving data from off-chip memory 1030 with an associated load time (for example, the first load time may be the timestep at which first dataflow path 1022 receives data from off-chip memory 1030).

In some implementations, the first dataflow path 1022 of the second section cut 1020 may have one or more stages, for example Stage 4A (1024) and Stage 5A (1025), and the second dataflow path 1023 of the second section cut 1020 may have one or more compute stages, for example Stage 4B (1026) and Stage 5B (1027), wherein each stage is preceded by and followed by a stage buffer (not shown). The first 1022 and second 1023 dataflow paths of the second section cut 1020 may join at a final joining stage 1028 (i.e., (Joining) Stage 6). The stage buffer depth balancing described herein may detect the final joining stage 1028 of second section cut 1020. Next, the stage buffer balancing method may determine the total stage buffer depth between the final joining stage 1028 and initial shared stage 1021 for the first 1022 and the second 1023 dataflow paths of second section cut 1020 (first dataflow path 1022 having a first total stage buffer depth and second dataflow path 1023 having a second total stage buffer depth). Finally, the stage buffer balancing method may balance the first and the second total stage buffer depths of the first 1022 and the second 1023 dataflow paths of second section cut 1020.

Figure 11A:
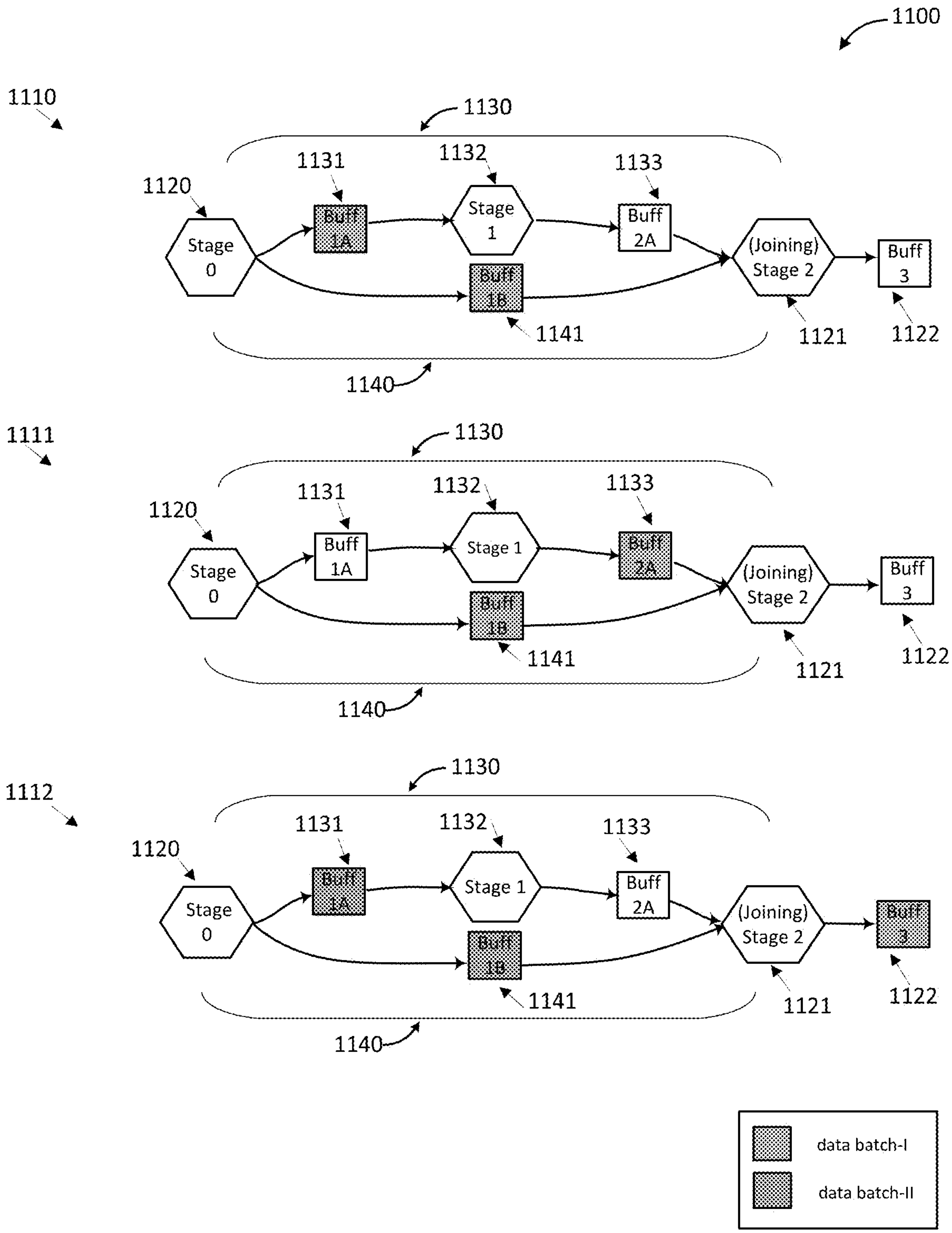
FIG. 11A shows one example of dataflow paths having unbalanced stage buffer depths, with dataflow slowed by back pressure over three sequential timesteps.
Figure 11B:
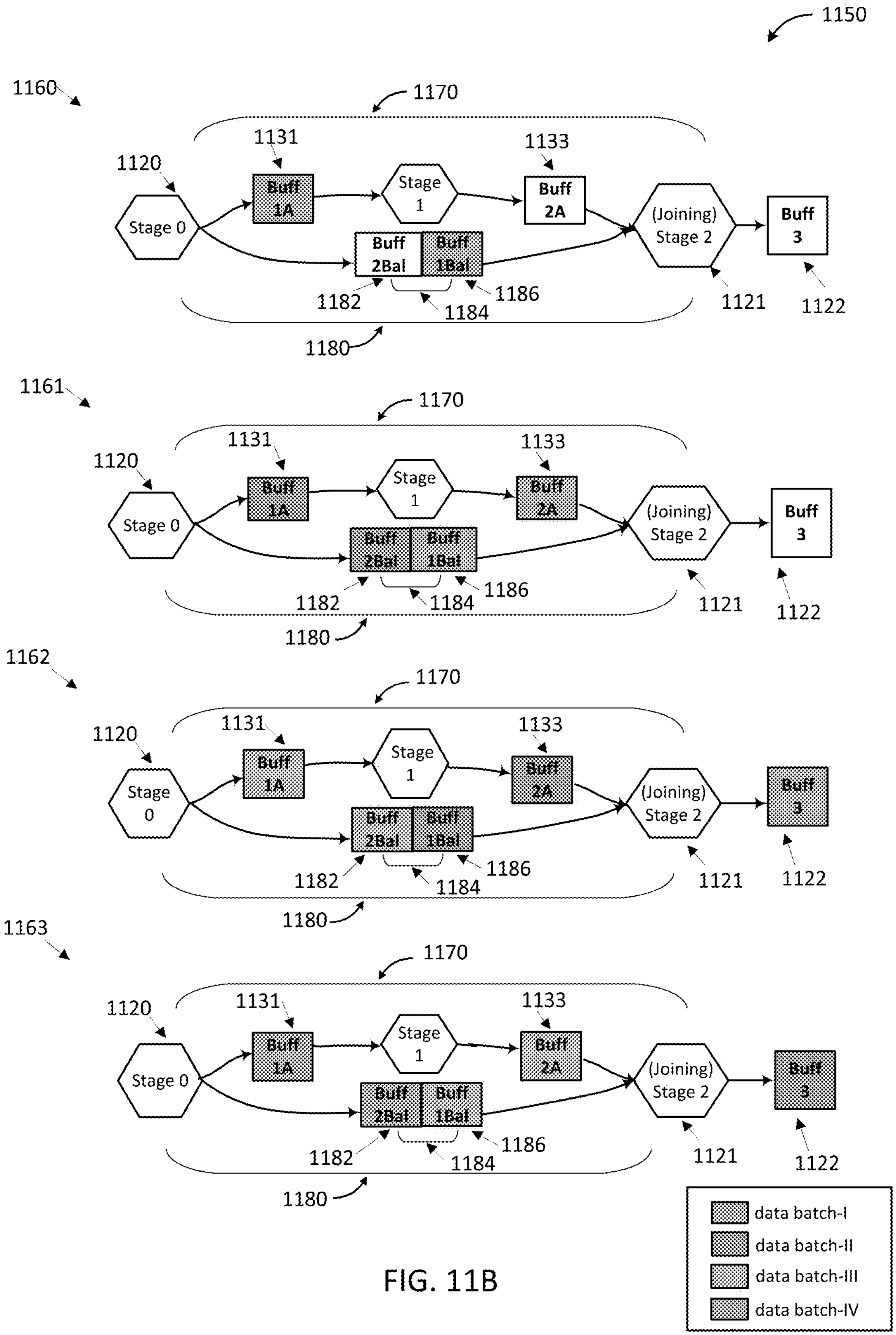
FIG. 11B shows one example of dataflow paths having balanced stage buffer depths, with dataflow traversing efficiently over four sequential timesteps.

FIG. 11A and FIG. 11B are a set of before-compute subgraphs 1100 and a set of after-compute subgraphs 1150, respectively, showing one example of stage buffer balancing for a CGR dataflow computing system. The set of before-compute subgraphs 1100 depicts a time series of dataflow over three sequential timesteps (a first timestep 1110, a second timestep 1111, and a third timestep 1112). The set of before-compute subgraphs 1100 may have their stage buffer depths balanced, via buffer balancing described herein, to produce the set of after-compute subgraphs 1150, appearing as a time series depiction of dataflow over four sequential timesteps (a balanced first timestep 1160, a balanced second timestep 1161, a balanced third timestep 1162, a balanced fourth timestep 1163). One with skill in the art can appreciate that the following described buffer balancing may be adapted for code statements rather than for a compute graph.

In before-compute subgraph 1100, a final joining stage 1121 may be detected in a section cut (not shown), along with a first dataflow path 1130 and a second dataflow path 1140. Final joining stage 1121 may consume data from first dataflow path 1130 and/or second dataflow path 1140. Each stage may comprise one or more computation nodes (not shown) and may perform logical operations on data (i.e., tensor data). Each stage (for example, 1120, 1132, 1121, corresponding to Stage 0, Stage 1, (Joining) Stage 2, respectively) may be preceded by and followed by a stage buffer (for example, 1131, 1133, 1141, 1122, corresponding to Buff 1A, Buff 2A, Buff 1B, Buff 3). An initial shared stage 1120 may be a forking stage that broadcasts data to first dataflow path 1130 and second dataflow path 1140.

In some exemplary implementations, the first total stage buffer depth comprises a first summation of each stage buffer depth of the first dataflow path, and the second total stage buffer depth comprises a second summation of each stage buffer depth of the second dataflow path. For example, as depicted in first timestep 1110, first dataflow path 1130 may have a first total stage buffer depth comprising the summed stage buffer depths of a first 1131 and a second 1133 stage buffer. The second dataflow path 1140 may have a second total stage buffer depth comprising the (summed) stage buffer depth of a third stage buffer 1141.

The depth of each logical stage buffer is designed to hold a specific data batch that will traverse a given dataflow path. Each data batch may be defined by a tensor size and a number of tensor data samples. For example, a larger depth stage buffer will hold more tensor data samples than a smaller depth stage buffer, assuming the tensor size is the same between the data samples. Each logical stage buffer depth may be implemented by one or more physical PMUs, each PMU having a defined physical depth.

After determining the first total stage buffer depth and the second total stage buffer depth are not equal, the first and second total stage buffer depths may be compared. For example, the first total stage buffer depth may be determined to be greater than the second total stage buffer depth, yielding a greater total stage buffer depth of the first and second total stage buffer depths. Alternatively, the first total stage buffer depth may be determined to be lesser than the second total stage buffer depth, yielding a lesser total stage buffer depth of the first and second total stage buffer depths.

For example, before-compute subgraph 1100 may include first dataflow path 1130, having the first total stage buffer depth, and second dataflow path 1140, having the second total stage buffer depth. A summation of each stage buffer depth of the first dataflow path 1130 (i.e., depth of Buff 1A (1131) plus the depth of Buff 2A (1133)) may yield the first total stage buffer depth. A summation of each stage buffer depth of the second dataflow path 1140 (i.e., depth of Buff 1B (1141)) may yield the second total stage buffer depth. After comparing their depths, the first total stage buffer depth and the second total stage buffer depth are not equal.

In some implementations, balancing the first and second total stage buffer depths may include modifying at least one total stage buffer depth to generate a balanced first and second total stage buffer depth (i.e., wherein the balanced first and second total stage buffer depth provides the balanced first total stage buffer depth is equal to the balanced second total stage buffer depth). In some examples, balancing the first and second total stage buffer depths may optionally include modifying at least one load time to generate a balanced first and second total stage buffer depth).

In some exemplary implementations, balancing the first and second total stage buffer depth may include determining a lesser total stage buffer depth of the first and second total stage buffer depths. For example, in before-compute subgraph 1110, the second total stage buffer depth corresponding to second dataflow path 1140, may be determined to be less than the first total stage buffer depth corresponding to first dataflow path 1130. In response to determining, the lesser total stage buffer depth may be increased (as shown in after compute subgraph 1160) to generate a balanced first 1170 and second 1180 total stage buffer depth.

Balancing the first total stage buffer depth and the second total stage buffer depth may be accomplished by increasing the total stage buffer depth associated with one or more dataflow paths. In some implementations, increasing the total stage buffer depth may be accomplished by tuning the depth of an existing stage buffer (i.e. adding a partial stage buffer depth to a selected stage buffer). In other implementations, increasing the total stage buffer depth may be accomplished by inserting a whole stage buffer. In yet other implementations, increasing the total stage buffer depth may be accomplished by some combination of tuning the depth of an existing stage buffer and/or inserting the whole stage buffer.

Tuning may be depicted in after-compute subgraph 1150. For example, the second dataflow path 1140 has the second total stage buffer depth (corresponding to the lesser total stage buffer depth). The second total stage buffer depth may be increased by selecting a selected stage buffer 1186 (Buff 1Bal), and adding a partial stage buffer 1182 (Buff 2Bal), having a partial stage buffer depth, to the selected stage buffer 1186 (Buff 1Bal), to produce the increased stage buffer 1184, having an increased total stage buffer depth. As a result of tuning, the balanced first and second total stage buffer depth are generated (corresponding to balanced first 1170 and second 1180 dataflow paths).

Tuning corresponds to increasing memory unit usage having an associated pattern memory unit (PMU) cost of tuning. One or more additional memory units may be needed to implement the partial stage buffer 1182 to generate increased stage buffer 1184. However, the associated PMU cost of tuning should be minimized. In other words, the number of additional memory units required to implement first partial stage buffer 1182 is minimized to reduce all associated costs of tuning, while also satisfying the constraints of providing sufficient PMUs.

Some memory units within the grid of memory units correspond to one or more stage buffers that perform stage flow control. In the depicted example, a stage control flow signal may be sent from downstream stage buffer 1122 (Buff 3) to upstream stage buffer 1133 (Buff 2A) of first dataflow path 1130 and to upstream stage buffer 1141 (Buff 1B) of second dataflow path 1140. The stage control flow signal from downstream stage buffer 1122 (Buff 3) may trigger the next batch of data to enter (Joining) Stage 2 (1121), provided both upstream stage buffers (1133 and 1141) contain readied data, as shown at timesteps 1111, 1161, 1162, and 1163.

Dataflow paths having unbalanced stage buffer depths can experience back pressure. In an asynchronous architecture, data may be passed downstream to the next compute stage when all required data inputs are ready. In some cases, part of the required data are ready, whereas other required data are unready. For example, in first timestep 1110, back pressure occurs. Buff 1B (1141) of second dataflow path 1140 contains ready data, but Buff 2A (1133) of the first dataflow path 1130 lacks ready data. As a result, the ready data inputs of the second dataflow path 1140 will block/pause their upstream dataflow path. In second timestep 1111, back pressure is alleviated because the unready data of the first dataflow path 1130 becomes ready (i.e., Buff 2A (1133) of first dataflow path 1130 holds ready data), and upstream dataflow is no longer blocked/paused.

As a result of unbalanced total stage buffer depths contributing to back pressure along second dataflow path 1140, additional timesteps are required for data to traverse the pipeline. Specifically, 3 timesteps may be required to pipeline data batch-I, 5 timesteps may be required to pipeline data batch-II, and 7 timesteps may be required to pipeline data batch-III, and 9 timesteps may be required to pipeline data batch-IV. One having skill in the art can recognize that dataflow paths having unbalanced stage buffer depths could cause back pressure, an overall performance drop, and a reduction in throughput.

In the set of after-compute subgraphs 1150, back pressure never occurs in any of the depicted timesteps. At first timestep 1160, neither balanced dataflow path contains ready input data, so back pressure does not occur. In each subsequent timestep (1161-1163), the balanced first 1170 and second 1180 dataflow paths contain ready data inputs at the same time. One having skill in the art can appreciate that balancing stage buffers will alleviate back pressure, increase performance, and increase dataflow throughput.

As a result of the balanced first 1170 and second 1180 total stage buffer depths, data pipelining occurs much more efficiently. In particular, 3 timesteps may be required to pipeline data batch-I, 4 timesteps may be required to pipeline data batch-II, 5 timesteps may be required to pipeline data batch-III, and 6 timesteps may be required to pipeline data batch-IV. One having skill in the art can appreciate that stage buffer depth balancing significantly improves the performance of a CGR dataflow computing system, especially compared to a GPU-based dataflow computing system.

Figure 12:
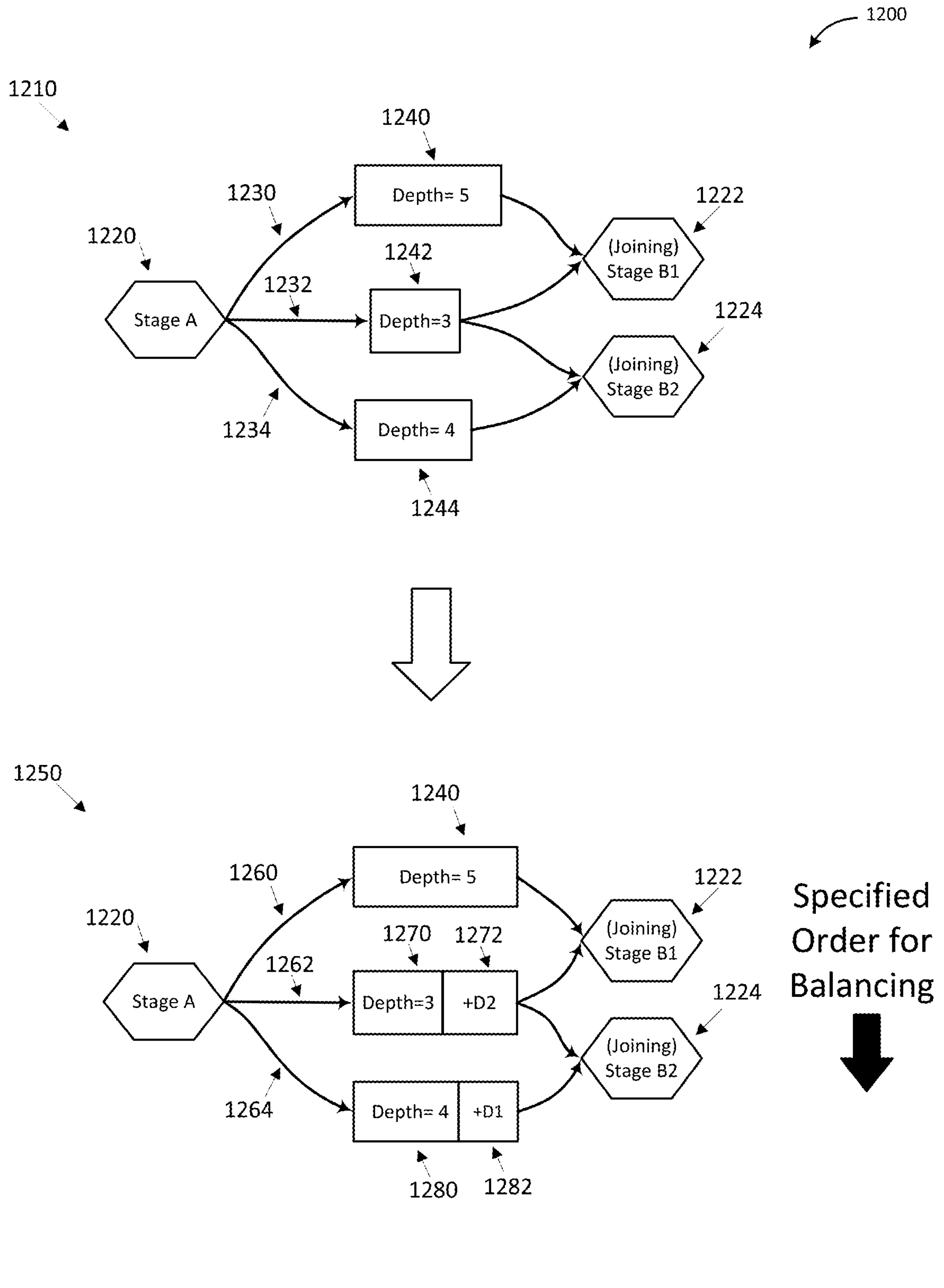
FIG. 12 depicts a set of before-compute and after-compute subgraphs, having unbalanced and balanced (via tuning) stage buffer depths.

FIG. 12 shows a set of compute subgraphs 1200 of one example of the stage buffer depth balancing for a CGR dataflow computing system. As depicted, the set of compute subgraphs 1200 include before-compute subgraph 1210, having unbalanced stage buffer depths, and after-compute subgraph 1250, having balanced stage buffer depths. Stage buffer balancing is applied to before-compute subgraph 1210 to generate after-compute subgraph 1250. One having skill in the art will appreciate that the following described buffer balancing method could be adapted for code statements rather than a compute graph.

In the depicted before-compute subgraph 1210, a first final joining stage 1222 and a second final joining stage 1224 may be detected. First final joining stage 1222 may consume dataflow from a first dataflow path 1230 via a first stage buffer 1240, having a first total stage buffer depth of 5. First final joining stage 1222 may consume dataflow from a second dataflow path 1232 via a second stage buffer 1242, having a second total stage buffer depth of 3. Second final joining stage 1224 may consume dataflow from second dataflow path 1232. Second final joining stage 1224 may consume dataflow from a third dataflow path 1234 via a third stage buffer 1244, having a third total stage buffer depth of 4. Two or more joining dataflow paths having unbalanced total stage buffer depths may cause back pressure, reduce throughput, and yield an overall performance drop in the CGR dataflow computing system.

In before-compute subgraph 1210, the first total stage buffer depth (of first dataflow path 1230) and the second total stage buffer depth (of second dataflow path 1232) are not equal. The first and second total stage buffers may be balanced in after-compute subgraph to generate the balanced first 1260 and second 1262 total stage buffer depths.

Balancing the first and second total stage buffers may include determining the lesser total stage buffer depth of the first and second total stage buffers. In this example, the second total stage buffer depth (of the second dataflow path 1232) is determined to have the lesser total stage buffer depth of the first and second total stage buffer depths. After determining, the lesser total stage buffer depth may be increased to generate the balanced first 1260 and second 1262 total stage buffer depths.

In some implementations, balancing the first and second total stage buffer depths may include determining a first loading time and a second loading time, and then modifying the first or second loading time.

In some implementations, balancing the first total stage buffer depth and the second total stage buffer depth may include tuning. As an example of tuning, a selected stage buffer 1270 is selected and a partial stage buffer 1272, having a partial stage buffer depth of 2 (+D2), is added to the selected stage buffer depth (Depth=3). The selected stage buffer may be a part of the lesser total stage buffer depth. As a result of tuning, balanced second dataflow path 1262 has a balanced second total stage buffer depth of 5, and balanced first dataflow path 1260 has a balanced first total stage buffer depth of 5.

Tuning corresponds to increasing memory unit usage having an associated pattern memory unit (PMU) cost of tuning. During tuning, one or more additional memory units may be needed to implement the partial stage buffer 1272 to generate a balanced first and second total stage buffer depth. However, the associated PMU cost of tuning should be minimized. In other words, the number of additional memory units required to implement partial stage buffer 1272 is minimized to reduce all associated costs of tuning, while also satisfying the constraints of providing sufficient PMUs.

The stage buffer balancing as described herein provides a global solver-based buffer balancing method, such that each dataflow path leading to a final joining stage will have a balanced total stage buffer depth. A dataflow path (having a total stage buffer depth) may be shared by two or more final joining stages; and, that dataflow path may belong to a set of dataflow paths (having a set of total stage buffer depths) shared by those two or more final joining stages. For example, second dataflow path 1232 is shared by first 1222 and second 1224 final joining stages, and the first 1230, second 1232, and third 1234 dataflow paths belong to a set of dataflow paths shared by two final joining stages.

Moreover, the global solver-based buffer balancing provides at least one global solution to generate a balanced set of total stage buffer depths. More specifically, the global solver determines the order required to balance the set of total stage buffer depths.

The importance of order is provided in the following details. The global solver determines the first 1230 and second 1232 total stage buffer depths should be balanced first, to generate a balanced first 1260 and second 1262 total stage buffer depth, each having depth of 5. The global solver determines the balanced second 1262 and the third 1234 total stage buffer depths should be balanced next, to generate a balanced second 1262 and third 1264 total stage buffer depth, each having depth of 5. Due to the order specified by the global solver, the balanced first 1260, second 1262, and third 1264 dataflow paths each have a balanced total stage buffer depth of 5. Therefore, a global solution is achieved.

In contrast, if order is assumed to be unimportant, the following scenario may occur without a global solver (i.e., using a heuristics-based algorithm that cannot guarantee a global solution). For example, the second 1232 and third 1234 total stage buffer depths may be balanced to generate a balanced second 1262 and third 1264 total stage buffer depth, each having depth of 4. Next, the first 1230 and balanced second 1262 total stage buffer depths may be balanced to generate a balanced first 1260 and second 1262 total stage buffer depth, each having depth of 5. In this case, the balanced third 1264 dataflow, having depth 4, is not equal/not balanced with the balanced first 1260 and second 1262 dataflow paths, having depth 5. Therefore, a global solution is not achieved.

One having skill in the art will recognize and appreciate the global solver-based balancing method as described herein is guaranteed to generate one or more global solutions to buffer balancing, while also minimizing PMU resources; and, the global solver provides one or more buffer balancing solutions in an efficient manner.

FIG. 13 depicts a model used for the global solver-based buffer balancing.

Mixed integer programming MIP 1310 provides a general approach to solve for a vector, x, in which x is a sign-constrained variable, such that $x \geq 0$. Moreover, some of the x variables are integers. In general, the goal is to find a vector, x, that maximizes or minimizes the target function of $c^T \cdot x$. MIP is a linear combination of weighted x variables, such that each x is associated with a corresponding weight. The target function is subject to two constraints that include $A \cdot x \leq b$ and $x \geq 0$. In MIP, c belongs to the set of real numbers (dimension=m), b belongs to the set of real numbers (dimension=n), and A is a matrix belonging to the set of real numbers (dimension=m·n). MIP provides a general mathematical approach to model a global solver-based buffer balancing problem.

The depicted variables 1320 define criteria that may be used to generate a global buffer balancing solution. Each stage buffer has a stage buffer depth (depth_i). The stage buffer depth is related to the number of data samples and the size of each tensor data sample. A dataflow path may have one or more stage buffers, each with its respective stage buffer depth (depth_i). During balancing, an existing stage buffer depth may be tuned by adding a partial stage buffer, having a partial stage buffer depth; and in the case of tuning, the additional partial stage buffer depth may be added to the existing stage buffer depth variable (depth_i). Moreover, a stage buffer depth may be implemented by a specified number of physical PMUs (pmu_i).

When balancing the total stage buffer depth of the first and second dataflow paths, additional stage buffer depth (new_buffer_depth_j) may be added to generate the balanced first and second total stage buffer depths. Additional stage buffer depth (new_buffer_depth_j) may be provided by adding a whole stage buffer, having a whole stage buffer depth. Moreover, when balancing the first and second total stage buffer depths, their respective first and second load data starting time (load_L) may be used and/or modified to generate the balanced first and second total stage buffer depths.

Load time exhibition 1330 depicts one way to provide additional buffer depth during stage buffer balancing. Load time refers to the starting point for transferring data from off-chip memory to an on-chip dataflow path. The starting point for transferring an input data batch may vary for each input data. Load time is not subject to any additional constraints.

As shown in load time exhibition 1330, the first dataflow path (Path 1) and the second dataflow path (Path 2) provide data to joining stage 1 via first total stage buffer (Depth=5) and second total stage buffer (Depth=3). The total stage buffer depths are not equal. Balancing the first and second total stage buffer depths may occur by modifying the load time from off-chip memory to on-chip dataflow. Specifically, a second load time may be modified from second load time of zero to a modified second load time of 3 (load_L=3). In this example, balancing the first and second total stage buffer depths may include determining a first load time and a second load time, and then modifying the second load time, to generate balanced first and second total stage buffer depths.

As depicted in constraints 1340, two types of constraints must be satisfied for the global solver-based buffer balancing to generate one or more global solutions. First, the buffer resource constraint requires that enough physical PMUs are implemented to provide sufficient logical stage buffer depth to generate balanced first and second total stage buffer depths. Each stage buffer depth must satisfy the following constraint, pmu_i*depth_per_PMU≥depth_i, and each additional stage buffer depth (via tuning and/or inserting a whole stage buffer) must satisfy the following constraint, pmu_j*depth_per_PMU≥new_buffer_depth_j.

Constraints 1340 also shows a path buffer depth constraint. The path buffer depth constraint ensures that the total stage buffer depth of each dataflow path into a final joining stage is balanced. For each detected final joining stage, the path buffer depth constraint ensures that a first dataflow path having a first total stage buffer and a second dataflow path having a second the total stage buffer depth are balanced. One having skill in the art will recognize that two or more dataflow paths may be balanced by the global solver, as described herein.

The path buffer depth constraint may include load time, existing stage buffer depth, and new stage buffer depth variables for each total stage buffer depth being balanced. Also, the path buffer depth constraint includes the total stage buffer depth as a summation of each stage buffer depth in the dataflow path. Specifically, the path buffer depth constraint provides the following, load_L in path 1+sum (depth_i in path1)+sum (new_buffer_depth_j in path1)=load_L in path2+sum (depth_i in path2)+sum (new_buffer_depth_j in path2). The path buffer depth constraint guarantees that a balanced first and second total stage buffer depth will be generated.

The objective function 1350 provides a method to minimize the PMU resources used to implement the balanced first and second total stage buffer depths. In some cases of balancing the first and second total stage buffer depths, too many PMU resources may be introduced, which can oversubscribe resources and generate a lower quality solution (i.e., lower throughput, lower performance). Therefore, the objective function provides a global solution to buffer balancing that minimizes PMU usage. One having skill in the art will recognize that a reduced memory footprint can increase the number of PCUs that may be available for each operation, reduces congestion/inflexibility on the chip, and improves overall PMU and PCU usage.

FIG. 14A depicts one example 1400 of applying the global solver-based buffer balancing to a section cut having an unbalanced set of buffers.

Before-compute subgraph 1410 shows one example of an unbalanced subgraph before obtaining a solution via the global solver-based buffer balancing, as described herein. A first 1419*a* and second 1419*b* final joining stage may be detected. Data traverses, starting from off-chip memory at load time 1411 (load_L) and flowing to first final joining stage 1419*a* via a first dataflow path with a first stage buffer 1412 and a second dataflow path with a second stage buffer 1413. Similarly, data traverses to second final joining stage 1419*b* via the second dataflow path with the second stage buffer 1413 and a third dataflow path with a third stage buffer 1414. The stage buffer depths of the first 1412, second 1413, and third 1414 stage buffers before balancing the stage buffers are depth 5, 3, and 4, respectively.

In this example, the first, second and third total stage buffer depths are provided by the first 1412, second 1413, and third 1414 stage buffers (since there are no additional stage buffers in this example for a summation).

The set of constraints and objective function 1420, as applied by the global solver-based buffer balancing, are depicted with reference to before-compute subgraph 1410. A path buffer depth constraint is provided for joining stage 1, in which the first total stage buffer depth (depth_1) for first dataflow path via first stage buffer 1412 is balanced with the second total stage buffer depth (depth_2) for second dataflow path via second stage buffer 1413; and, the path buffer depth constraint allows for load time 1411 (load_1) and additional stage buffer depth (new_buffer_depth_1, new_buffer_depth_2) that may be added to the first and/or second total stage buffer depths to generate a balanced first and second total stage buffer depth. A similar path buffer depth constraint is provided for joining stage 2, to generate a balanced second and third total stage buffer depth.

After balancing each set of total stage buffer depths to generate a (globally) balanced set of total stage buffers, the objective function is applied to minimize the PMU resources utilized while still providing sufficient PMUs to satisfy the constraints. The objective function seeks to minimize the total PMUs required for existing stage buffers, as well as the total PMUs required for additional stage buffers needed to globally balance stage buffers.

Additional stage buffer depth may be provided by tuning and/or inserting a whole stage buffer (with a whole stage buffer depth). Additional buffer depth may be provided by tuning the depth of one or more existing stage buffers. Additional buffer depth may be provided by inserting the whole stage buffer. In other implementations, inserting the whole stage buffer, having the whole stage buffer depth, occurs by preferably inserting the whole stage buffer at a location at the end of the specified dataflow path (i.e., the end of the dataflow path that is closest to the specified final joining stage). In other exemplary implementations, additional stage buffer depth may be provided by tuning and/or inserting the whole stage buffer to the specified dataflow path.

After-compute subgraph 1430 depicts one solution, in which the stage buffers are balanced. This solution balances the first, second, and third total stage buffer depths by tuning the second 1413 and third 1414 stage buffers. Specifically, in after-compute subgraph 1430, the balanced second total stage buffer depth is tuned by adding a partial depth of 2 to generate a balanced second stage buffer 1433, having a balanced second total stage buffer depth of 5. Similarly, the balanced third total stage buffer depth is tuned by adding a partial depth of 1 to generate a balanced third stage buffer 1434, having a balanced third total stage buffer depth of 5. One having skill in the art will recognize that global buffer balancer can optimize performance, throughput, and alleviate back pressure during dataflow.

A first solution with balanced buffers 1440 is shown. The load time variable is detected, but not modified in this example. Before tuning, depth_1 is 5, depth_2 is 3, and depth_3 is 4. After tuning, depth_1 is 5, depth_2 is 5, and depth_3 is 5. No whole stage buffer was inserted in the first solution 1440, as new_buffer_depth_1~4 are all none.

FIG. 14B shows after-compute subgraph 1450 that depicts a second solution, in which the stage buffers are balanced. The second solution balances the first, second, and third total stage buffer depths by tuning and/or by inserting a whole stage buffer. By tuning, the second 1413 stage buffer may be increased by adding a partial stage buffer, having a partial stage buffer depth of 2, to generate a balanced first total stage buffer depth (corresponding to balanced first stage buffer 1452) and a balanced second total stage buffer depth (corresponding to balanced second stage buffer 1453), each having a balanced depth of 5.

After-compute subgraph 1430 also shows an example of inserting a whole stage buffer depth to balance stage buffers. Specifically, by inserting the whole stage buffer 1458 having a whole stage buffer depth of 1, the third stage buffer 1414 may be increased to generate a balanced third total stage buffer depth (that includes 1454 and 1458), having a balanced third total stage buffer depth of 5.

A second solution with balanced buffers 1460 is shown. The load time variable is detected, but not modified in this example. Before tuning, depth_1 is 5, depth_2 is 3, and depth_3 is 4. After tuning, depth_1 is 5, depth_2 is 5, and depth_3 is 4. One whole stage buffer is inserted in second solution 1460, depicted as new_buffer_depth_1~3 are all none and new_buffer_depth_4 is 1.

Minimizing PMU resources 1470 via the PMU buffer resource constraint may distinguish between PMU requirements for the first solution 1440 and second solution 1460. As shown in this example, first solution 1440 has an associated PMU cost of tuning that is equivalent to 2 PMU. As shown in this example, second solution 1460 has an associated PMU cost of inserting the whole buffer that is equivalent to 1 PMU. In the first 1440 and second 1460 solutions, a same associated cost of tuning that increases depth_2=3 to depth_2=5 occurs, so that associated PMU cost of tuning is 3 PMU that is added to each of the first and second solution's total associated PMU cost (a total associated PMU cost for the first solution is the associated PMU cost of tuning (2 PMU+3 PMU), whereas the total associated PMU cost for the second solution is the associated PMU cost of tuning (3 PMU) and the associated PMU cost of inserting the whole buffer (1 PMU); so the total associated PMU cost is minimized if the second solution is selected to balance the first and second total stage buffer depths).

Minimizing PMU resources 1470 compares the PMU requirements of the first 1440 and second 1460 solutions. A distinction between two or more globally balanced buffer solutions may be provided by comparing a total associated PMU cost for each solution and selecting the solution wherein the total associated PMU cost is minimized (a total associated PMU cost comprises a summation of each associated PMU cost of tuning and each associated cost of. For example, first solution 1440 has a first total associated PMU cost of 5 PMU, and second solution 1460 has a second total associated PMU cost of 4 PMU. To minimize the total associated PMU cost, the second solution is selected to effectively balance stage buffer depths while also minimized PMU resource usage.

The examples disclosed herein include a system for reducing latency and increasing throughput in a reconfigurable computing system, the system comprising:

- a host computer comprising a graph optimization module configured to conduct a method comprising:
  - receiving a user program for execution on a reconfigurable dataflow computing system, the reconfigurable dataflow computing system comprising a grid of compute units and a grid of memory units interconnected with a switching array, the user program comprising a plurality of tensor-based algebraic expressions
  - converting the plurality of tensor-based algebraic expressions to an intermediate representation comprising a plurality of section cuts, each section cut preceded by and followed by an immediately adjacent off-chip memory, each section cut comprising a plurality of stages, each stage comprising one or more nodes, each node comprising one or more logical operations executable via dataflow through one or more compute units of the grid of compute units, each stage preceded by or followed by a stage buffer, each stage buffer corresponding to one or more memory units within the grid of memory units
  - detecting a final joining stage in a section cut, the final joining stage consuming a first dataflow path and a second dataflow path, the first dataflow path having a first total stage buffer depth and the second dataflow path having a second total stage buffer depth
  - determining the first total stage buffer depth and the second total stage buffer depth are not equal
  - balancing the first total stage buffer depth and the second total stage buffer depth
  - wherein dataflow through each stage buffer is controlled by one or more memory units within the grid of memory units Optional features for the above system include:

- wherein the first total stage buffer depth comprises a first summation of each stage buffer depth of the first dataflow path, and the second total stage buffer depth comprises a second summation of each stage buffer depth of the second dataflow path
- wherein balancing the first total stage buffer depth and the second total stage buffer depth comprises determining a first load time and a second load time, and then modifying the first or second load time
- wherein balancing the first total stage buffer depth and the second total stage buffer depth comprises determining a lesser total stage buffer depth of the first and second total stage buffer depths, and in response to determining, increasing the lesser total stage buffer depth to generate a balanced first and second total stage buffer depths
- wherein balancing the first total stage buffer depth and the second total stage buffer depth comprises tuning
  - wherein tuning corresponds to increasing memory unit usage having an associated pattern memory unit (PMU) cost of tuning, such that the associated PMU cost of tuning is minimized, and wherein a total associated PMU cost is minimized
- wherein balancing the first total stage buffer depth and the second total stage buffer depth comprises inserting a whole stage buffer
  - wherein inserting the whole stage buffer corresponds to increasing memory unit usage having an associated PMU cost of inserting, such that the associated PMU cost of inserting is minimized, and wherein the total associated PMU cost is minimized
- wherein balancing the first total stage buffer depth and the second total stage buffer depth comprises tuning and inserting a whole stage buffer
  - wherein tuning corresponds to increasing memory unit usage having an associated PMU cost of tuning, such that the associated PMU cost of tuning is minimized, wherein inserting the whole stage buffer corresponds to increasing memory unit usage having an associated PMU cost of inserting, such that the associated PMU cost of inserting is minimized, and wherein the total associated PMU cost is minimized The embodiments disclosed herein include a method for reducing latency and increasing throughput in a reconfigurable computing system, the method comprising:

- receiving a user program for execution on a reconfigurable dataflow computing system, the reconfigurable dataflow computing system comprising a grid of compute units and a grid of memory units interconnected with a switching array, the user program comprising a plurality of tensor-based algebraic expressions
- converting the plurality of tensor-based algebraic expressions to an intermediate representation comprising a plurality of section cuts, each section cut preceded by and followed by an immediately adjacent off-chip memory, each section cut comprising a plurality of stages, each stage comprising one or more nodes, each node comprising one or more logical operations executable via dataflow through one or more compute units of the grid of compute units, each stage preceded by or followed by a stage buffer, each stage buffer corresponding to one or more memory units within the grid of memory units detecting a final joining stage in a section cut, the final joining stage consuming a first dataflow path and a second dataflow path, the first dataflow path having a first total stage buffer depth and the second dataflow path having a second total stage buffer depth determining the first total stage buffer depth and the second total stage buffer depth are not equal balancing the first total stage buffer depth and the second total stage buffer depth; and, wherein dataflow through each stage buffer is controlled by one or more memory units within the grid of memory units Optional features for the above method include:

wherein the first total stage buffer depth comprises a first summation of each stage buffer depth of the first dataflow path, and the second total stage buffer depth comprises a second summation of each stage buffer depth of the second dataflow path wherein balancing the first total stage buffer depth and the second total stage buffer depth determining a first load time and a second load time, and then modifying the first or second load time wherein balancing the first total stage buffer depth and the second total stage buffer depth comprises determining a lesser total stage buffer depth of the first and second total stage buffer depths, and in response to determining, increasing the lesser total stage buffer depth to generate a balanced first and second total stage buffer depths wherein balancing the first total stage buffer depth and the second total stage buffer depth comprises tuning wherein tuning corresponds to increasing memory unit usage having an associated pattern memory unit (PMU) cost of tuning, such that the associated PMU cost of tuning is minimized, and wherein a total associated PMU cost is minimized wherein balancing the first total stage buffer depth and the second total stage buffer depth comprises inserting a whole stage buffer wherein inserting the whole stage buffer corresponds to increasing memory unit usage having an associated PMU cost of inserting, such that the associated PMU cost of inserting is minimized, and wherein the total associated PMU cost is minimized wherein balancing the first total stage buffer depth and the second total stage buffer depth comprises tuning and inserting the whole stage buffer wherein tuning corresponds to increasing memory unit usage having an associated PMU cost of tuning, such that the associated PMU cost of tuning is minimized, wherein inserting the whole stage buffer corresponds to increasing memory unit usage having an associated PMU cost of inserting, such that the associated PMU cost of inserting is minimized, and wherein the total associated PMU cost is minimized The embodiments disclosed herein include a computer program product comprising a computer readable storage medium having program instructions embodied therewith, wherein the computer readable storage medium is not a transitory signal per se, wherein the program instructions are executable by a processor to cause the processor to conduct a method comprising:

receiving a user program for execution on a reconfigurable dataflow computing system, the reconfigurable dataflow computing system comprising a grid of compute units and a grid of memory units interconnected with a switching array, the user program comprising a plurality of tensor-based algebraic expressions converting the plurality of tensor-based algebraic expressions to an intermediate representation comprising a plurality of section cuts, each section cut preceded by and followed by an immediately adjacent off-chip memory, each section cut comprising a plurality of stages, each stage comprising one or more nodes, each node comprising one or more logical operations executable via dataflow through one or more compute units of the grid of compute units, each stage preceded by or followed by a stage buffer, each stage buffer corresponding to one or more memory units within the grid of memory units detecting a final joining stage in a section cut, the final joining stage consuming a first dataflow path and a second dataflow path, the first dataflow path having a first total stage buffer depth and the second dataflow path having a second total stage buffer depth determining the first total stage buffer depth and the second total stage buffer depth are not equal balancing the first total stage buffer depth and the second total stage buffer depth, and wherein dataflow through each stage buffer is controlled by one or more memory units within the grid of memory units As will be appreciated by those of ordinary skill in the art, aspects of the various embodiments described herein may be embodied as a system, device, method, process, or computer program product apparatus. Accordingly, elements of the present disclosure may take the form of an entirely hardware embodiment, an entirely software embodiment (including firmware, resident software, micro-code, or the like) or an embodiment combining software and hardware aspects that may all generally be referred to herein as a "apparatus," "circuit," "circuitry," "module," "computer," "logic," "FPGA," "unit," "system," or other terms. Furthermore, aspects of the various embodiments may take the form of a computer program product embodied in one or more computer-readable medium(s) having computer program code stored thereon. The phrases "computer program code" and "instructions" both explicitly include configuration information for a CGRA, an FPGA, or other programmable logic as well as traditional binary computer instructions, and the term "processor" explicitly includes logic in a CGRA, an FPGA, or other programmable logic configured by the configuration information in addition to a traditional processing core. Furthermore, "executed" instructions explicitly includes electronic circuitry of a CGRA, an FPGA, or other programmable logic performing the functions for which they are configured by configuration information loaded from a storage medium as well as serial or parallel execution of instructions by a traditional processing core.

Any combination of one or more computer-readable storage mediums may be utilized. A computer-readable storage medium may be embodied as, for example, an electronic, magnetic, optical, electromagnetic, infrared, or semiconductor system, apparatus, or device, or other like storage devices known to those of ordinary skill in the art, or any suitable combination of computer-readable storage mediums described herein. In the context of this document, a computer-readable storage medium may be any tangible medium that can contain, or store, a program and/or data for use by or in connection with an instruction execution system, apparatus, or device. Even if the data in the computer-readable storage medium requires action to maintain the storage of data, such as in a traditional semiconductor-based dynamic random-access memory, the data storage in a computer-readable storage medium can be considered to be non-transitory. A computer data transmission medium, such as a transmission line, a coaxial cable, a radio-frequency carrier, and the like, may also be able to store data, although any data storage in a data transmission medium can be said to be transitory storage. Nonetheless, a computer-readable storage medium, as the term is used herein, does not include a computer data transmission medium.

Computer program code for carrying out operations for aspects of various embodiments may be written in any combination of one or more programming languages, including object-oriented programming languages such as Java, Python, C++, or the like, conventional procedural programming languages, such as the "C" programming language or similar programming languages, or low-level computer languages, such as assembly language or micro-code. In addition, the computer program code may be written in VHDL, Verilog, or another hardware description language to generate configuration instructions for an FPGA, CGRA IC, or other programmable logic. The computer program code if converted into an executable form and loaded onto a computer, FPGA, CGRA IC, or other programmable apparatus, produces a computer implemented method or process. The instructions which execute on the computer, FPGA, CGRA IC, or other programmable apparatus may provide the mechanism for implementing some or all of the functions/acts specified in the flowchart and/or block diagram block or blocks. In accordance with various implementations, the computer program code may execute entirely on the user's device, partly on the user's device and partly on a remote device, or entirely on the remote device, such as a cloud-based server. In the latter scenario, the remote device may be connected to the user's device through any type of network, including a local area network (LAN) or a wide area network (WAN), or the connection may be made to an external computer (for example, through the Internet using an Internet Service Provider). The computer program code stored in/on (i.e., embodied therewith) the non-transitory computer-readable medium produces an article of manufacture.

The computer program code, if executed by a processor, causes physical changes in the electronic devices of the processor which change the physical flow of electrons through the devices. This alters the connections between devices which changes the functionality of the circuit. For example, if two transistors in a processor are wired to perform a multiplexing operation under control of the computer program code, if a first computer instruction is executed, electrons from a first source flow through the first transistor to a destination, but if a different computer instruction is executed, electrons from the first source are blocked from reaching the destination, but electrons from a second source are allowed to flow through the second transistor to the destination. So, a processor programmed to perform a task is transformed from what the processor was before being programmed to perform that task, much like a physical plumbing system with different valves can be controlled to change the physical flow of a fluid.

What is claimed is:

1. A system for reducing latency and increasing throughput in reconfigurable dataflow processors, the system comprising:

a host computer comprising a graph optimization module configured to conduct a method comprising:

receiving a user program for execution on a reconfigurable dataflow computing system, the reconfigurable dataflow computing system comprising a grid of compute units and a grid of memory units interconnected with a switching array, the user program comprising a plurality of tensor-based algebraic expressions;

converting the plurality of tensor-based algebraic expressions to an intermediate representation comprising a plurality of section cuts, each section cut preceded by and followed by an immediately adjacent off-chip memory, each section cut comprising a plurality of stages, each stage comprising one or more nodes, each node comprising one or more logical operations executable via dataflow through one or more compute units of the grid of compute units, each stage preceded by or followed by a stage buffer, each stage buffer corresponding to one or more memory units within the grid of memory units;

detecting a final joining stage in a section cut, the final joining stage consuming a first dataflow path and a second dataflow path, the first dataflow path having a first total stage buffer depth and the second dataflow path having a second total stage buffer depth;

determining the first total stage buffer depth and the second total stage buffer depth are not equal;

balancing the first total stage buffer depth and the second total stage buffer depth; and wherein dataflow through each stage buffer is controlled by one or more memory units within the grid of memory units.

2. The system of claim 1, wherein balancing the first total stage buffer depth and the second total stage buffer depth comprises determining a first load time and a second load time, and then modifying the first or second load time.

3. The system of claim 2, wherein balancing the first total stage buffer depth and the second total stage buffer depth further comprises tuning or inserting a whole stage buffer.

4. The system of claim 3, wherein tuning corresponds to increasing memory unit usage having an associated PMU cost of tuning, such that the associated PMU cost of tuning is minimized, wherein inserting the whole stage buffer corresponds to increasing memory unit usage having an associated PMU cost of inserting, such that the associated PMU cost of inserting is minimized, and wherein a total associated PMU cost is minimized.

5. The system of claim 1, wherein balancing the first total stage buffer depth and the second total stage buffer depth comprises determining a lesser total stage buffer depth of the first and second total stage buffer depths, and in response to determining, increasing the lesser total stage buffer depth to generate a balanced first and second total stage buffer depth.

6. The system of claim 1, wherein balancing the first total stage buffer depth and the second total stage buffer depth comprises tuning.

7. The system of claim 6, wherein tuning corresponds to increasing memory unit usage having an associated pattern memory unit (PMU) cost of tuning, such that the associated PMU cost of tuning is minimized, and wherein a total associated PMU cost is minimized.

8. The system of claim 1, wherein balancing the first total stage buffer depth and the second total stage buffer depth comprises inserting a whole stage buffer.

9. The system of claim 8, wherein inserting the whole stage buffer corresponds to increasing memory unit usage having an associated PMU cost of inserting, such that the associated PMU cost of inserting is minimized, and wherein a total associated PMU cost is minimized.

10. A method for reducing latency and increasing throughput in a reconfigurable computing system, the method comprising:

receiving a user program for execution on a reconfigurable dataflow computing system, the reconfigurable dataflow computing system comprising a grid of compute units and a grid of memory units interconnected with a switching array, the user program comprising a plurality of tensor-based algebraic expressions;

converting the plurality of tensor-based algebraic expressions to an intermediate representation comprising a plurality of section cuts, each section cut preceded by and followed by an immediately adjacent off-chip memory, each section cut comprising a plurality of stages, each stage comprising one or more nodes, each node comprising one or more logical operations executable via dataflow through one or more compute units of the grid of compute units, each stage preceded by or followed by a stage buffer, each stage buffer corresponding to one or more memory units within the grid of memory units;

detecting a final joining stage in a section cut, the final joining stage consuming a first dataflow path and a second dataflow path, the first dataflow path having a first total stage buffer depth and the second dataflow path having a second total stage buffer depth;

determining the first total stage buffer depth and the second total stage buffer depth are not equal;

balancing the first total stage buffer depth and the second total stage buffer depth; and wherein dataflow through each stage buffer is controlled by one or more memory units within the grid of memory units.

11. The method of claim 10, wherein balancing the first total stage buffer depth and the second total stage buffer depth comprises determining a first load time and a second load time, and then modifying the first or second load time.

12. The method of claim 11, wherein balancing the first total stage buffer depth and the second total stage buffer depth further comprises tuning or inserting a whole stage buffer.

13. The method of claim 12, wherein tuning corresponds to increasing memory unit usage having an associated PMU cost of tuning, such that the associated PMU cost of tuning is minimized, wherein inserting the whole stage buffer corresponds to increasing memory unit usage having an associated PMU cost of inserting, such that the associated PMU cost of inserting is minimized, and wherein a total associated PMU cost is minimized.

14. The method of claim 10, wherein balancing the first total stage buffer depth and the second total stage buffer depth comprises determining a lesser total stage buffer depth of the first and second total stage buffer depths, and in response to determining, increasing the lesser total stage buffer depth to generate a balanced first and second total stage buffer depth.

15. The method of claim 10, wherein balancing the first total stage buffer depth and the second total stage buffer depth comprises tuning.

16. The method of claim 15, wherein tuning corresponds to increasing memory unit usage having an associated pattern memory unit (PMU) cost of tuning, such that the associated PMU cost of tuning is minimized, and wherein a total associated PMU cost is minimized.

17. The method of claim 10, wherein balancing the first total stage buffer depth and the second total stage buffer depth comprises inserting a whole stage buffer.

18. The method of claim 17, wherein inserting the whole stage buffer corresponds to increasing memory unit usage having an associated PMU cost of inserting, such that the associated PMU cost of inserting is minimized, and wherein a total associated PMU cost is minimized.

19. A computer program product comprising a computer readable storage medium having program instructions embodied therewith, wherein the computer readable storage medium is not a transitory signal per se, wherein the program instructions are executable by a processor to cause the processor to conduct a method comprising:

receiving a user program for execution on a reconfigurable dataflow computing system, the reconfigurable dataflow computing system comprising a grid of compute units and a grid of memory units interconnected with a switching array, the user program comprising a plurality of tensor-based algebraic expressions;

converting the plurality of tensor-based algebraic expressions to an intermediate representation comprising a plurality of section cuts, each section cut preceded by and followed by an immediately adjacent off-chip memory, each section cut comprising a plurality of stages, each stage comprising one or more nodes, each node comprising one or more logical operations executable via dataflow through one or more compute units of the grid of compute units, each stage preceded by or followed by a stage buffer, each stage buffer corresponding to one or more memory units within the grid of memory units;

detecting a final joining stage in a section cut, the final joining stage consuming a first dataflow path and a second dataflow path, the first dataflow path having a first total stage buffer depth and the second dataflow path having a second total stage buffer depth;

determining the first total stage buffer depth and the second total stage buffer depth are not equal;

balancing the first total stage buffer depth and the second total stage buffer depth; and wherein dataflow through each stage buffer is controlled by one or more memory units within the grid of memory units.

* * * * *